United States Patent [19]

Libonati

[11] Patent Number: 5,056,086

[45] Date of Patent: Oct. 8, 1991

[54] APPARATUS FOR PROVIDING TELEPHONIC MASS ANNOUNCEMENT SERVICE AND METHODS FOR USE THEREIN

[75] Inventor: Michael G. Libonati, Harrison, N.J.

[73] Assignee: Bell Communications Research, Inc., Livingston, N.J.

[21] Appl. No.: 454,720

[22] Filed: Dec. 21, 1989

[51] Int. Cl.$^5$ .............................................. H04J 3/02
[52] U.S. Cl. ......................................... 370/62; 379/88
[58] Field of Search ............... 370/62, 61, 68; 379/88, 379/89

[56] References Cited

U.S. PATENT DOCUMENTS

| | | | |
|---|---|---|---|
| 4,031,324 | 6/1977 | Dudonis | 379/148 |
| 4,255,618 | 3/1981 | Danner et al. | 364/513.5 |
| 4,357,493 | 11/1982 | Anderson et al. | 379/72 |
| 4,389,546 | 6/1983 | Glisson et al. | 379/88 |
| 4,446,336 | 5/1984 | Bethel et al. | 379/76 |
| 4,577,062 | 3/1986 | Hilleary et al. | 379/88 |
| 4,600,809 | 7/1986 | Tatsumi et al. | 379/88 |
| 4,720,848 | 1/1988 | Akiyama | 379/88 |
| 4,757,267 | 7/1988 | Riskin | 379/113 |
| 4,791,660 | 12/1988 | Oye et al. | 370/61 |
| 4,817,086 | 3/1989 | Oye et al. | 370/85.1 |
| 5,020,095 | 5/1991 | Morganstein et al. | 379/88 |

Primary Examiner—Douglas W. Olms
Assistant Examiner—Min Jung
Attorney, Agent, or Firm—James W. Falk; Leonard Charles Suchyta

[57] ABSTRACT

Apparatus for a telephone switch, e.g. a tandem switch, for providing a telephonic mass announcement service and methods for use therein in providing passive and/or interactive announcements as well as interactive mass announcement based custom call routing services. Specifically, mass announcements are provided by connecting an announcement circuit as one input to a time-space-time (T/S/T) switch located within a tandem telephone switch and permitting the central processor that controls the tandem switch to establish a time slot connection between that circuit and any caller. Digitized announcements are stored in a main announcement store contained within the tandem switch.

28 Claims, 7 Drawing Sheets

MASS ANNOUNCEMENT SERVICE TANDEM SWITCH

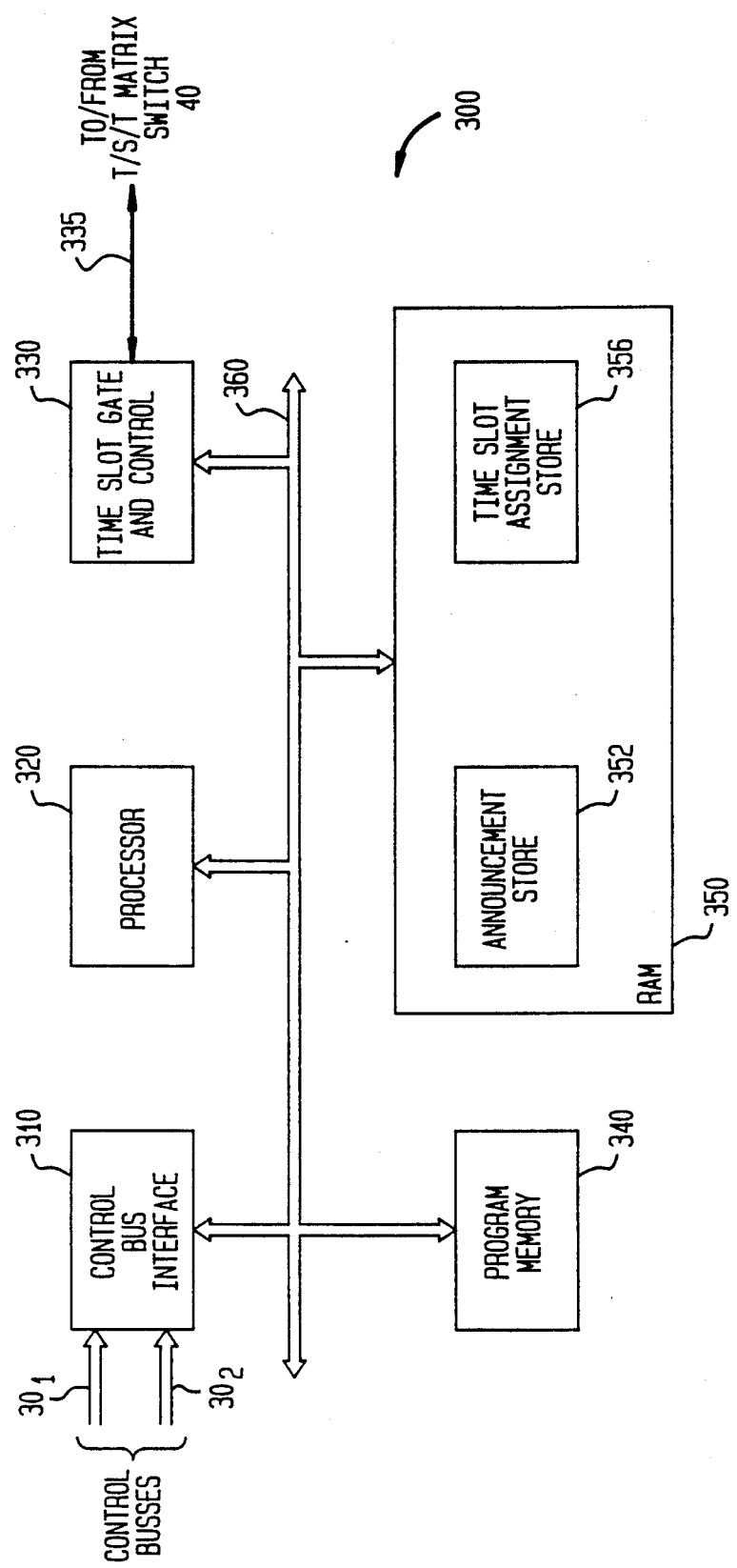

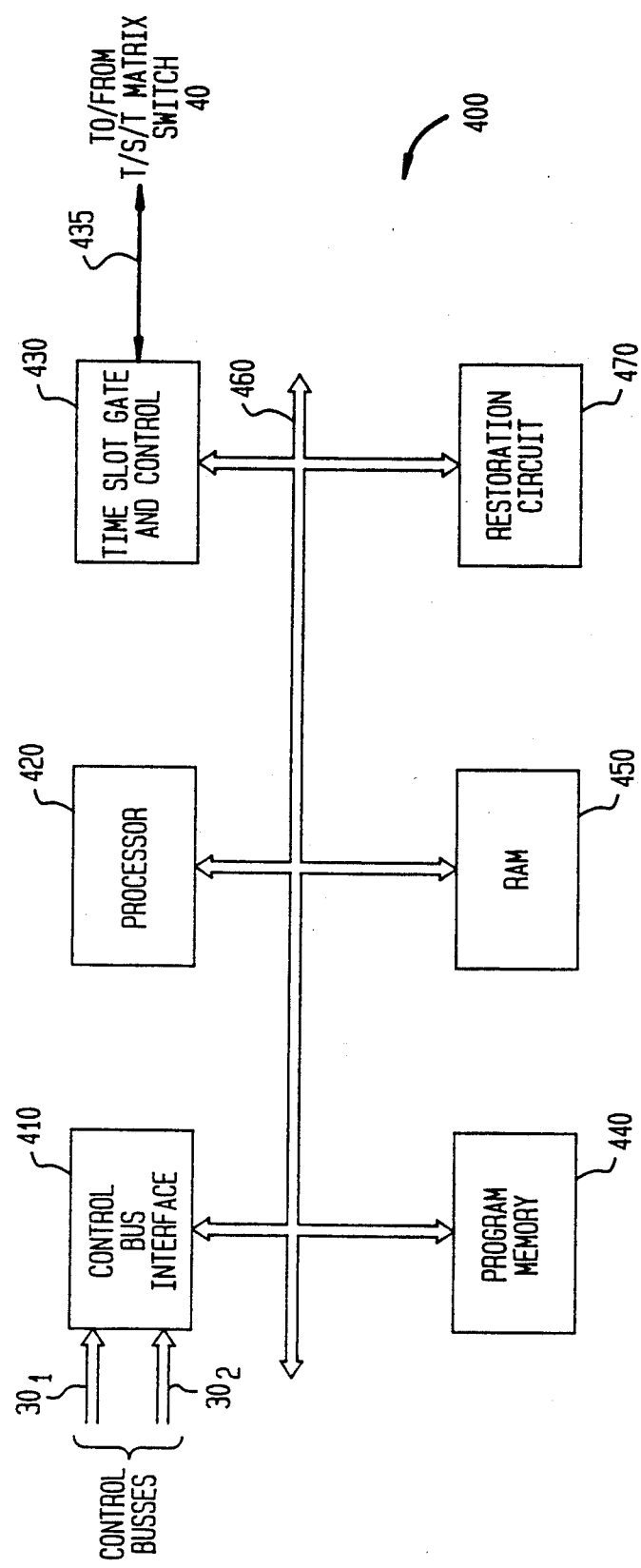

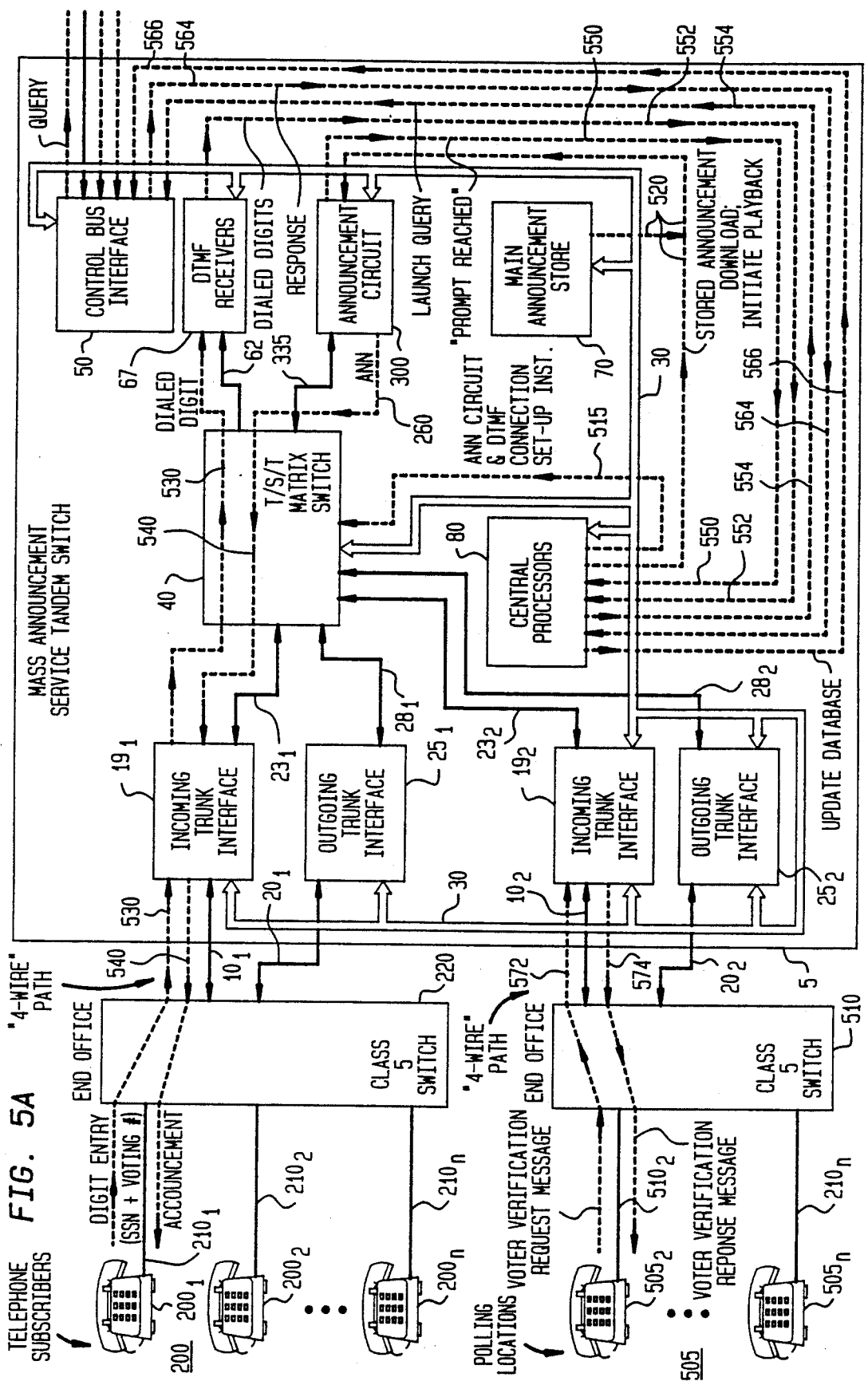

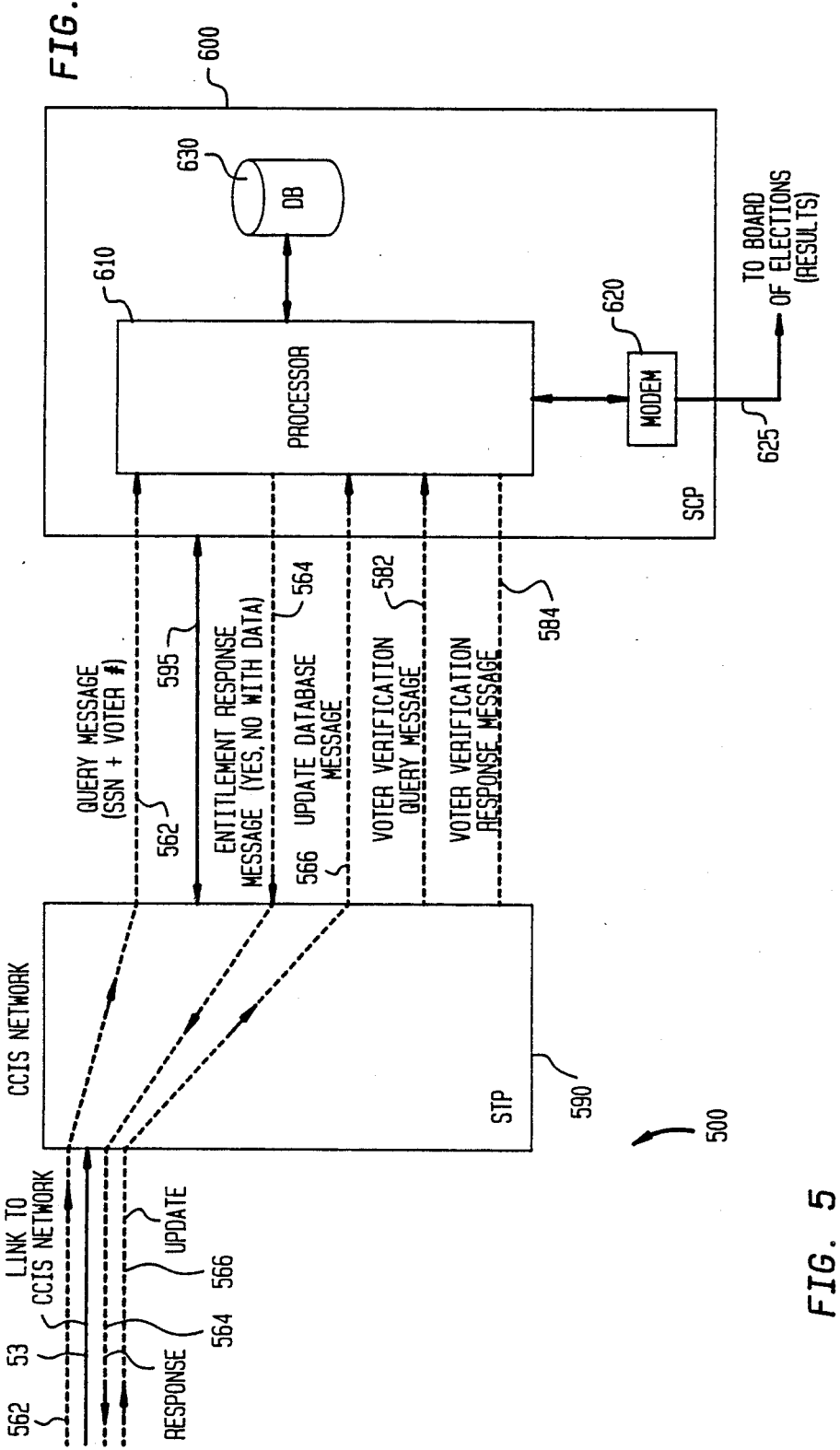

APPARATUS FOR PROVIDING TELEPHONIC MASS ANNOUNCEMENT SERVICE AND METHODS FOR USE THEREIN

BACKGROUND OF THE DISCLOSURE

1. Field of the Invention

The invention relates to apparatus, illustratively a tandem telephone switch, for providing telephonic mass announcement service and to methods for use therein in providing passive and/or interactive announcements as well as interactive mass announcement based customized call routing services.

2. Description of the Prior Art

For a number of years, many local telephone companies ("telcos") have provided their callers with various dial-up mass announcement services. Through these services, a caller dials a given telephone number and then, after a telephone connection is established, receives a particular recorded voice (audio) message associated with that number. The correct time and forecasted weather were the first announcements that were provided by most local telcos. Owing to the ease with which a caller could obtain timely information, these announcement services, though passive in nature (i.e. permitting no caller interaction other than dialing into an announcement number), became very popular with callers.

Currently, an increasingly wide array of mass announcement services, both passive (non-interactive) and interactive, the latter requiring a caller to dial a number to select an entry from a pre-defined menu(s) of available choices provided by the announcement in order to obtain a selected service, are being offered to telephone callers by private information providers (IPs) over telephone network connections provided by the local telcos. These providers prepare each announcement itself, receive telephone calls for these announcements over the network from requesting telephone callers and, for passive announcements, play announcements back to these callers through the network while, for interactive announcements, solicit information from each of these callers during the announcement to subsequently provide a desired service thereto. For reasons that will shortly become clear, IPs have generally limited their use of interactive announcements to non-call routing applications. Nevertheless, over the past five years, IPs have been offering an increasingly broad and diverse spectrum of audio services accessible through dial-up passive mass announcement offerings that goes well beyond mere time and weather information to encompass for example stock quotations, sports scores, ticket availability for various special events and other services based upon rendering specific timely information and through dial-up interactive announcements that encompasses for example merchandise ordering services and the like. Because these offerings satisfied wide and heretofore unfilled needs of callers for a broad range of inexpensive easily accessible timely information and/or for telephonic ordering services, these offerings produced a substantial increase in the demand for and usage of mass announcement services. As such, mass announcement services now generate a significant source of revenue for both IPs and the local telephone companies. Unfortunately, the number of subscriber numbers which has been allocated by the telcos to carry mass announcements has not kept up with the increasing demand for announcement services. Accordingly, the availability of new mass announcement services has been severely limited in many telephone service areas and, in conjunction with capacity limitations as discussed below and inherent in the manner through which announcement services are currently being provided by available mass announcement equipment, this frequently causes callers to experience some degree of aggravation and/or frustration in receiving mass announcements.

In particular, mass announcement services are provided through announcement equipment located at each IP. To provide a simple non-interactive voice announcement, an IP would merely use an analog voice storage device for announcement storage and playback along with an appropriate network interface that connects and interfaces this storage device to a dedicated telephone line. This device, in its simplest form, could be an analog tape recorder that plays a continuous loop of tape. Voice announcements, whether passive or even interactive, are generally provided on a non-barge-in first-come first-serve basis to successive telephone callers. Accordingly, with such a voice storage device, any new caller would need to wait until an announcement then being played to a prior caller once again reached its starting point before the new caller would be able to hear it. Since announcements are frequently a minute or more in duration, the delay ("latency") experienced by a caller in waiting for an announcement to repeat before he or she is able to hear it could maximally amount to slightly less than the length of the entire announcement and hence be quite annoying. In an effort to reduce the delay, phased announcements are widely used today. Here, three separate identical recordings of the same announcement are continually played on three separate corresponding dedicated telephone lines. Playback is configured such that an equal delay interval, which amounts to twenty seconds for a one minute announcement, occurs between the start of any two of these recordings. An incoming caller is connected to that recording which is the next to start. Through phased announcements, the maximum latency can be reduced to slightly less than one third of the total announcement time but this is still sufficiently long to aggravate many callers.

Moreover, call volume frequently exceeds the number of line terminations that is available on the announcement equipment. Consequently, individual callers are often placed in a first-in first-out queue and remain there until corresponding terminations subsequently become available. If the queue is long, then the length of time that a caller remains in the queue, i.e. the "holding" (queuing) delay, can become significant. In fact, certain announcements can generate such a heavy call volume that the queue rapidly fills before only a few callers receive the announcement. To cope with this situation, a central office that serves an IP may either throttle the call volume to an announcement number down to match the rate at which the queue is emptying or just block all subsequent calls to this number, by providing a busy signal to all subsequent callers, until the incoming call volume thereto subsides to a sufficiently low level. In either case, a large number of calls to this announcement will likely be blocked and result in lost revenue to this IP and to the telco that carries the call traffic.

At first blush, one might think that the incidence of blocked calls along with latency and holding delays can all be reduced by using additional groups of three dedicated lines and accompanying duplicated announcement equipment to handle incoming calls. This approach is quite problematic. First, announcement call traffic often exhibits very sharp peaks at irregular intervals and is substantially reduced at all other times. Using sufficient numbers of separate dedicated lines and duplicated phased announcement equipment to satisfactorily accommodate all incoming calls that would occur during any such peak would be extremely expensive for an IP and result in significant inefficiencies. As such, IPs attempt to design their announcement systems to handle a certain expected average call volume for a given announcement and consequently force callers, during periods of heavy call traffic, to tolerate a certain amount of latency and holding delay and a certain level of call blockage. Unfortunately, the average call volume for any announcement is often extremely difficult to estimate with any acceptable degree of accuracy thereby complicating the design and particularly the sizing of an announcement system. Second, apart from difficulties associated with designing the announcement system itself, a shortage of available announcement numbers currently exists in many sections of the country. In particular, as the popularity of announcement services, both passive and interactive, has substantially increased over the past few years, many telcos either are exhausting or have already exhausted the subscriber numbers that have been allocated to carry announcement services. As a result, new announcement services can not be offered in many sections of the country and many existing IPs face difficulty in obtaining new numbers to handle, even apart from traffic peaks, increases in expected average call volume for announcements already in service.

Thus, the limitations of traditional announcement equipment and capacity limitations experienced by the telcos in providing additional network connections, i.e. announcement numbers, have disadvantageously slowed the growth of new announcement services and the growth in revenues attainable thereby to both IPs and the telcos themselves.

While various attempts have been made in the art to overcome certain drawbacks associated with the manner in which announcement services are currently being provided, none of these attempts has proven to be completely satisfactory. One such attempt described in U.S. Pat. Nos. 4,357,493 (issued to T. W. Anderson et al on Nov. 2, 1982) and 4,446,336 (issued to L. D. Bethel et al on May 1, 1984) utilizes a mass announcement system that is connected to a toll switching system. This announcement system stores separate passive announcements in digitized pulse code modulated (PCM) form on a disk unit. Whenever an announcement is activated for service, that announcement is then transferred from the disk to a number of playback buffers for transmittal to subsequent callers. The same passive announcement is stored within each of these buffers but with an identical phase delay, typically 30 seconds, between any two successive playback buffers. The output of each playback buffer in the mass announcement circuit is continuously applied through a time slot interchange (TSI) circuit that feeds a time multiplex switching matrix (TSM) within the toll switching system. A "nailed-up" connection within the TSM itself connects one TSI circuit to another TSI circuit, the latter having a looped back connection. By virtue of these connections, the passive announcement residing in any one playback buffer can be continuously "fanned out" through these and other TSI circuits and the TSM to multiple available time slots and therethrough, in turn, to multiple callers. The time slots for each playback buffer are assigned to incoming calls that arrive closest to the relative starting time of the announcement residing in that buffer. While this mass announcement system accommodates an increased number of callers without using additional announcement numbers, callers are still grouped to hear the same passive announcement residing in each playback buffer. As such, each caller, depending upon the time at which his or her call arrived at the switching system relative to the time at which the start of the announcement will be read from the assigned playback buffer, will likely experience some latency up to a maximum of 30 seconds prior to hearing the announcement. This latency may frustrate and/or aggravate that caller.

Another attempt at providing passive announcements is described in U.S. Pat. No. 4,817,086 (issued to K. J. Oye on Mar. 28, 1989). Here, an announcement circuit, connected to a communication system through time division multiplexed (TDM) and packet busses, locally stores a passive announcement in compressed digitized PCM form. For playback, the system instructs the announcement circuit as to which time slot to use and which passive announcement to play thereon. Unfortunately, the announcement circuit can only play 16 different announcements at any one time, thereby severely limiting the number of different passive announcements that can be simultaneously accessed therethrough. As such, this announcement circuit is not readily amenable to simultaneously handling a large number of different passive announcements.

As noted above, interactive announcements are now seeing increasing use in a wide range of applications. However, very few of these applications involve call routing. One such call routing application involves embedding an interactive announcement within a local private branch exchange (PBX) for use in automatically routing an incoming call to a particular extension based upon a caller's dialed response to information requested therefrom by the announcement. Here, a caller is greeted by a voice announcement providing welcoming information followed by a subsequent request to the caller to enter a specific digit(s) from a verbal menu of choices in order to obtain a desired service or department. Once the digit(s) is entered, the PBX appropriately routes the call to its proper recipient. Through use of these announcements, a local PBX can automatically route a large number of incoming calls to appropriate extensions using a relatively small number of human operators.

Although IPs perceive a significant demand for offering customized call routing services using interactive announcements, it is currently uneconomic, in most instances, for them to provide these services. Specifically, an IP is connected to the telephone network at an end of a voice path established by a telco and routed thereby between a caller and that provider. Accordingly, if that IP were to re-route incoming calls on a customized basis, such as through use of an interactive announcement, that provider would essentially need to replicate a certain portion of the switching functions provided by the telco. This, in turn, would necessitate that the IP obtain a large number of dedicated lines and/or trunks from the telco for use in appropriately re-routing incoming calls and also use relatively complex switching equipment to re-route these calls over these lines and/or trunks accordingly. Even if the IP could obtain a necessary number of lines and/or trunks from the telco, the combined expense of the switching equipment, the dedicated lines and/or trunks needed to support this announcement, switch programming and other start-up costs would be quite significant and likely cause the price of the interactive announcement based custom call routing service to exceed the amount which most of its potential callers would be willing to pay therefor. Hence, although a significant demand for these customized call routing services exists, these services are now rarely offered, if at all, by IPs.

Thus, a need exists in the art for a mass announcement system that can provide announcements with reduced latency and holding delays. Such an announcement system should also have the capability to advantageously handle a relatively large number of different announcements as well as handle peak call volumes on a substantially non-blocking basis. The system should advantageously accommodate both non-interactive and interactive announcements without requiring a large number of announcement numbers provided by a telco and also provide interactive announcement based custom call routing services at a relatively low cost to an IP, specifically without the need to employ expensive switching equipment at the IP or a large number of dedicated lines and/or trunks terminating thereat.

SUMMARY OF THE INVENTION

Through my invention, I have substantially eliminated the deficiencies associated with mass announcement systems known in the art. Specifically, my inventive apparatus has a processor; means for digitally storing a first plurality of announcements; announcement circuit means for storing a second plurality of announcements and for producing a first time division multiplexed signal having a first plurality of recurring time slots wherein each announcement in the second plurality of announcements appears on a corresponding one of the first time slots; switch means, connected to the first time division multiplexed signal and to a second time division multiplexed signal and responsive to instructions received from the processor, for establishing a first time slot connection between a first time slot in the first time division multiplexed signal and a second recurring time slot in the second time division multiplexed signal and associated with a caller; and means for interconnecting the processor, the storing means and the announcement circuit means; and wherein the processor, in response to a telephone number dialed by the caller and associated with a selected one of the first plurality of announcements, instructs the switch means to establish the first time slot connection between the first and the second time slots, causes the selected announcement to be downloaded over the interconnection means from the storing means to the announcement circuit means for storage therein as one of the second plurality of announcements, and thereafter instructs the announcement circuit means to play back the selected announcement on the first time slot so as to carry the selected announcement over the first time slot connection from the announcement circuit to the caller.

In accordance with the teachings of a specific embodiment of my invention, an announcement circuit is connected as one input to a time-space-time (T/S/T) matrix switch located within a tandem telephone switch. This permits the central processors that control the tandem switch to establish a logical (here time slot) connection between that circuit and any caller. Digitized announcements are stored in a main announcement store that is also contained within the tandem switch and is controlled by the central processors. With this arrangement, the central processors respond to each incoming call for a specific announcement by establishing a time slot connection between that announcement circuit and the caller through the T/S/T matrix switch, downloading this announcement from the main announcement store into the announcement circuit and thereafter instructing the announcement circuit to play the announcement in PCM digital form over the time slot connection to the caller, and specifically over the caller's "receive" leg of a "four-wire" path established through the matrix switch. By connecting a sufficient number of announcement circuits as inputs to the T/S/T matrix switch within the tandem switch, any caller that reaches the tandem switch can be connected to an available time slot served by an announcement circuit to provide essentially non-blocking mass announcement service. In addition, for interactive mass announcements, the central processors connect a DTMF receiver to a time slot connection established through the T/S/T matrix switch to the caller's "transmit" leg of this "four-wire" path in order to obtain a digit(s) entered by the caller during playback of the interactive announcement. Also, for an interactive announcement, the announcement circuit executes a specific script, typically involving a decision tree contained therein, associated with this announcement and, in response to the entered digit(s), appropriately instructs the central processors within the tandem switch to route the call presently connected to the announcement in a specific manner for custom call routing services and/or to provide other call processing operations to support other interactive call services defined by the script.

Through my invention, the tandem switch can accommodate a substantial number of different announcements in which each announcement can be provided on a substantially non-blocking basis to individual callers during times of peak call volume therefor with substantially reduced latency and holding delays over those associated with announcement circuits known in the art. By sharing the announcement circuits, announcement processors, main announcement store and DTMF receivers among all the announcements provided by the switch, the costs of providing any one such announcement advantageously can be substantially reduced both to a caller therefor and to an associated IP from corresponding costs associated with announcement circuits known in the art.

In accordance with a feature of my invention, by processing an interactive announcement within a telephone switch, e.g. a tandem switch, prior to determining final route for an incoming call through that switch and routing the call according to interactive digit entry from the caller and in a manner defined by the script associated with the interactive announcement, a wide array of custom call routing and/or interactive caller data collection services can also be readily and inexpensively provided by this switch to respectively any caller thereto or a data recipient therefor and at a concomitant economical cost to an IP associated therewith.

BRIEF DESCRIPTION OF THE DRAWINGS

The teachings of the present invention can be readily understood by considering the following detailed description in conjunction with the accompanying drawings, in which:

FIG. 3 depicts a block diagram of announcement circuit 300 that forms part of tandem switch 5 shown in FIGS. 1A and 1B;

FIG. 4 depicts a block diagram of announcement processor 400 that also forms part of tandem switch 5 shown in FIGS. 1A and 1B;

FIG. 5 shows the correct alignment of the drawing sheets for FIGS. 5A and 5B; and FIGS. 5A and 5B collectively depict a simplified block diagram for interactive electronic voting system 500 which includes my inventive tandem switch 5, end office switches and a signal control point (SCP) operative through a common channel interoffice signalling (CCIS) network, and also collectively depict the basic message flow occurring within system 500.

To facilitate understanding, identical reference numerals have been used, where possible, to designate identical elements that are common to the figures.

DETAILED DESCRIPTION

Figure 1A:
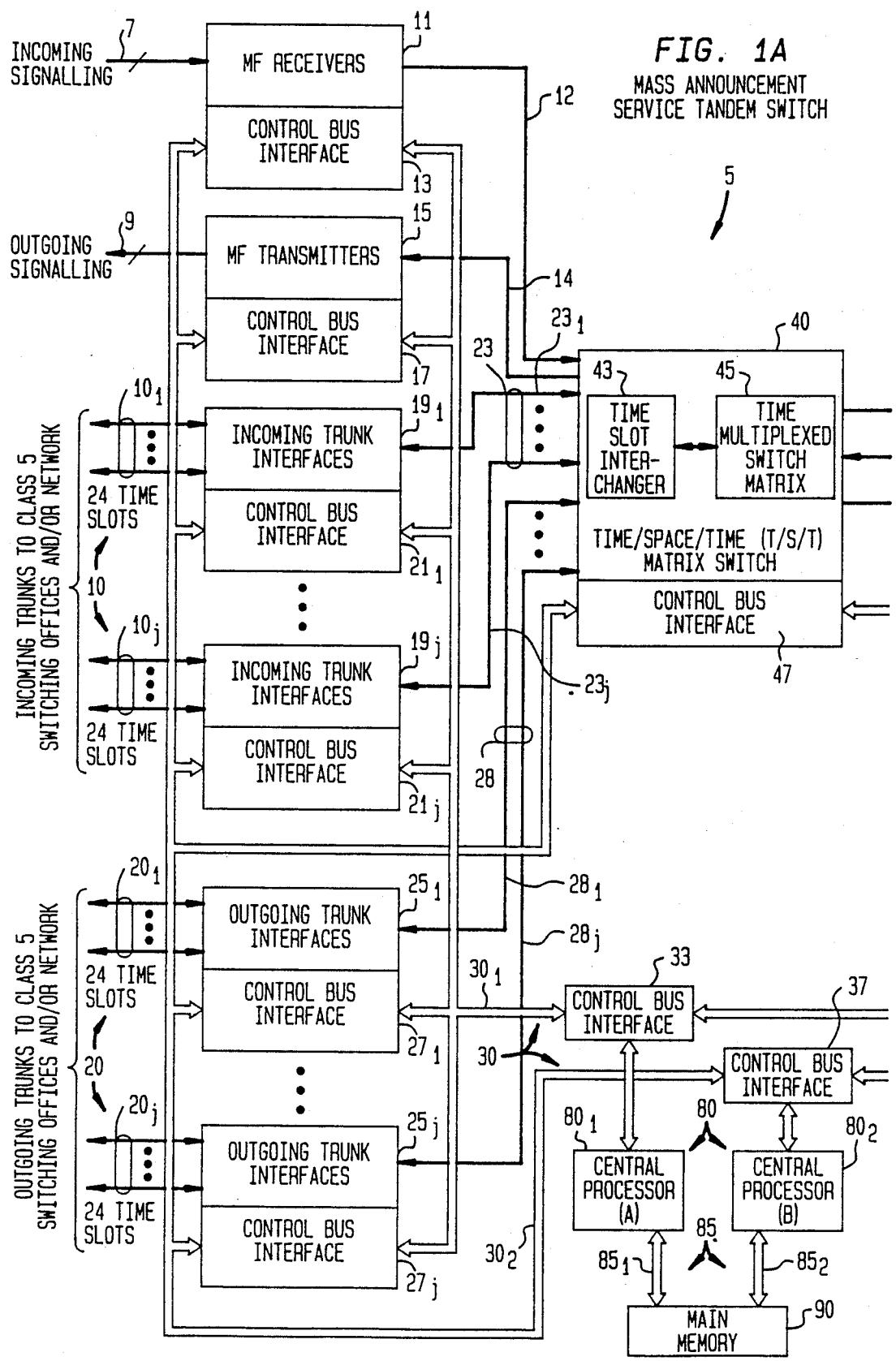
FIGS. 1A and 1B collectively depict a block diagram of mass announcement service tandem switch 5 that incorporates the teachings of the present invention.
Figure 1B:
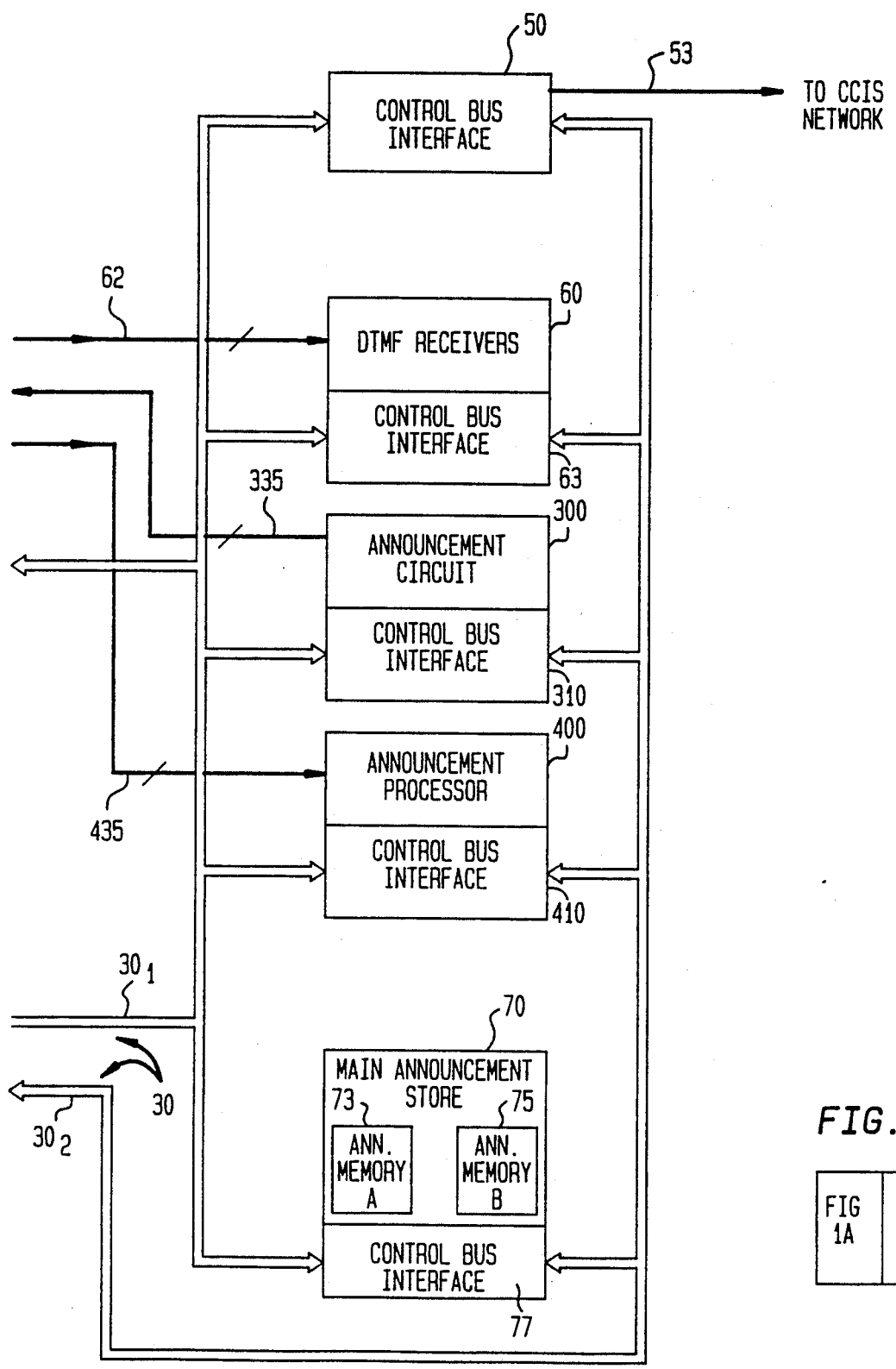
Figure 1:
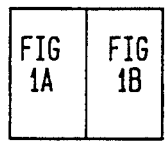
FIG. 1 shows the correct alignment of the drawing sheets for FIGS. 1A and 1B.

A block diagram of mass announcement service tandem switch 5 that incorporates the teachings of my invention is collectively depicted in FIGS. 1A and 1B, for which the correct alignment of the drawing sheets for these figures is shown in FIG. 1. Not only is tandem switch 5 able to route calls between local end office (so-called class 5) telephone switches connected thereto, to route calls to operator services and/or, where needed, to provide network access for calls emanating from any such local switch to an interexchange toll network as respectively accomplished by sector, operator or access tandem switches well known in the art, but also tandem switch 5 provides mass announcement service to callers that dial into pre-defined mass announcement numbers terminating at any of these local switches.

In an effort to familiarize the reader with sufficient details as to the general operation of a tandem switch sufficient to fully appreciate my invention, a brief explanation will first be given as to various well known components contained within tandem switch 5 and used in conjunction with routing calls therethrough. Thereafter, the description will address additional specific components situated within inventive tandem switch 5 that are used in accordance with my invention to provide mass announcements, whether passive (non-interactive) or interactive, to incoming callers as well as the inventive manner through which mass announcement service is provided by this tandem switch. This description will then conclude with discussing a particular application, specifically an interactive electronic voting system, that can utilize my inventive mass announcement service tandem switch as well as the operation of this switch in this system.

In particular, tandem switch 5 contains fault tolerant central processor 80 which controls the operation of various peripheral circuits that are used to process and switch incoming telephone calls through this switch. These peripherals which are well known include multi-frequency (MF) receivers 11; MF transmitters 15; incoming trunk interfaces 19 formed of incoming trunk interfaces $19_l, \ldots, 19_j$; outgoing trunk interfaces $25_1, \ldots, 25_j$; and time/space/time (T/S/T) matrix switch 40. Each of these peripherals is connected through a local control bus interface to redundant busses $30_1$ and $30_2$ that collectively form busses 30, e.g. control bus interface 13 for MF receivers 11, control bus interface 17 for MF transmitters 15, control bus interfaces $21_1, \ldots, 21_j$ and $27_1, \ldots, 27_j$ for incoming and outgoing trunk interfaces $19_1, \ldots, 19_j$ and $25_1, \ldots, 25_j$, respectively, and control bus interface 47 for T/S/T switch 40. Communication occurs over bus $30_1$ or $30_2$ depending upon which bus is active at any one time. Each of these control bus interfaces contains a well-known local processor and accompanying control circuitry (not specifically shown) which through busses 30 receives or provides data and instructions to central processors 80, and which, in turn, controls its associated peripheral to provide a certain call routing operation. Accordingly, these local processors in conjunction with central processors 80 form a distributed processing system within tandem switch 5. Inasmuch as the specific architecture of each of these local processors and the accompanying circuitry used to control its associated peripheral, the software executing in this local processor and the specific operations provided thereby are all well known in the art, the control bus interfaces will not be discussed in any further detail.

Busses $30_1$ and $30_2$ are themselves connected through corresponding control bus interfaces 33 and 37 to central processor $80_1$, also labelled as central processor A, and central processor $80_2$, also labelled as central processor B. Each of these central processors has an architecture that is also well known in the art. Together, these central processors typically operate in a well-known hot/standby configuration through which one, i.e. the "active", central processor controls the tandem switch at any one time while the other, i.e. the "standby", central processor remains in a standby or idle condition. When the "active" central processor fails or is taken off-line for any reason, the central processors reverse roles with the standby central processor becoming the active central processor and thereafter controlling the switch. Both of these central processors access dual port main memory 90 through respective busses $85_1$ and $85_2$ which together form busses 85. This memory contains appropriate software which through execution on either central processor $80_1$ or $80_2$ controls the operation of the entire tandem switch in a well known fashion to provide general call routing therethrough and also, as discussed in detail below and in accordance with my invention, to provide mass announcement service. Inasmuch as the portion of this software which controls the tandem switch to provide call processing functions, apart from mass announcement service and its attendant call routing, is well known to those skilled in the art, these portions will not be discussed any further.

Incoming traffic to tandem switch 5, whether from end office switches or the telephone network, is applied in time division multiplexed (TDM) form over trunk groups 10, which collectively includes trunk groups $10_1, \ldots, 10_j$, to incoming trunk interfaces 19 located within this tandem switch and which contain corresponding incoming trunk interfaces $19_1, \ldots, 19_j$. Each of these trunk groups contains a specific number of individual TDM trunks. The TDM traffic occurring on each of these individual trunks contains either 24 or 32 discrete channels occurring in corresponding recurring time slots—24 such slots if used in conjunction with American telecommunication networks or 32 such slots if used in conjunction with European networks. Each of these trunks can carry bi-directional traffic; although the communication associated with any one time slot on an individual trunk is unidirectional either from caller to called party or vice versa based upon the trunk connections that occur between the tandem and the corresponding local switches that serve the caller and called parties.

A bi-directional call path between a caller and a called party involves four recurring time slots: two recurring time slots associated with the caller and carried on individual trunk(s) in an incoming trunk group and two recurring time slots associated with the called party and carried on an individual trunk(s) in an outgoing trunk group. The two time slots that occur on an incoming trunk(s) form a so-called "four-wire" time slot connection (hereinafter referred to for simplicity as a "four-wire" path) between a caller and switch 5; while the two time slots that occur on an outgoing trunk(s) form a so-called "four-wire" path between switch 5 and a called party. The label "incoming" or "outgoing" as to the trunk groups and interfaces merely defines the direction through which the call is established through the tandem, i.e. an incoming trunk carries digitized traffic from a local switch or the network to the tandem while an outgoing trunk carries traffic in the reverse direction. Tandem switch 5, similar to any other tandem switch known in the art, exchanges data contained within two recurring time slots occurring on the incoming trunk(s) with data contained within two recurring time slots occurring on the outgoing(s) trunk so as to interconnect two separate "four-wire" paths leading to and from switch 5 and thereby establishes a logical connection through the switch sufficient to carry digitized data bi-directionally between the caller and called parties. Of course, appropriate recurring time slots associated with "four-wire" paths for three or more parties can be exchanged within switch 5 in order to implement conference bridging, which is not relevant here.

Given the overall time slot "data exchange" function provided by tandem switch 5, each of the incoming trunk interfaces, such as interface $19_1$, multiplexes TDM bit streams incoming from either local switches and/or the network and that appear on trunks within each associated incoming trunk group, e.g. incoming trunk group $10_1$, into respective TDM time slots in a single high speed TDM bit stream that, in turn, is applied over a respective lead, e.g. lead $23_1$, to T/S/T matrix switch 40. Such an incoming TDM bit stream occurring over an individual trunk in an incoming trunk group, such as trunk group $10_1$, would carry digitized traffic originating from a caller in one time slot for connection through tandem switch 5 and subsequent routing through another local switch and/or the network to a called party, i.e. from the caller's "transmit" leg of a "four-wire" path associated therewith. In addition, the same incoming trunk interface, here for example incoming trunk interface $19_1$, demultiplexes individual outgoing TDM bit streams produced by T/S/T matrix switch 40 and occurring within respective time slots in the high speed TDM bit stream associated with this interface, i.e. that on lead $23_1$, and inserts these outgoing TDM bit streams into proper time slots on appropriate incoming trunks within a trunk group. Each such outgoing TDM bit stream appearing over an incoming trunk group carries digitized traffic routed through tandem switch 5 from the called party to the caller, i.e. over the caller's "receive" leg of the "four-wire" path leading thereto. For any bi-directional connection between a caller and a called party that has been established through tandem switch 5, two different time slots are used over an incoming trunk(s) that connect a caller to switch 5, thereby establishing a so-called "four-wire" path running therebetween. All the incoming trunk interfaces, specifically trunk interfaces $19_1, \ldots, 19_j$, are connected through corresponding leads $23_1, \ldots, 23_j$ which collectively form leads 23 that carry high speed TDM bit streams between these interfaces and T/S/T matrix switch 40. In a similar fashion, a "four-wire" path is established from tandem switch 5 to a called party through a trunk connection(s) over outgoing trunk groups 20 to a local switch and/or the network. Outgoing trunk groups 20 which are formed of outgoing trunk groups $20_1, \ldots, 20_j$ are connected to outgoing trunk interfaces $25_1, \ldots, 25_j$ which, in turn, are connected through corresponding leads $28_1, \ldots, 28_j$ which collectively form leads 28 that also carry high speed TDM bit streams between these interfaces and T/S/T matrix switch 40. Each outgoing trunk carries the same number of TDM channels, i.e. either 24 or 32 channels, and at the same bit rate as each incoming trunk.

Digitized data is exchanged between the time slots associated with the two "four-wire" paths for the caller and called parties by T/S/T matrix switch 40. This matrix switch, formed of time slot interchanger 43 interconnected to time multiplexed matrix switch 45, establishes two unidirectional connections between each of two pairs of corresponding time slots. Each pair of these time slots contains one time slot associated with each of these two "four-wire" paths. Time slot interchanger 43 provides initial time-space and final space-time paths to and from T/S/T matrix switch 40. Time multiplexed matrix switch 45, which is frequently implemented as a solid state cross-point switch array, provides space division multiplexing between respective time slots. The respective time and space connections are defined by instructions which T/S/T matrix switch 40 receives, through control bus interface 47, from central processors 80. As such, T/S/T matrix switch 40 establishes a bi-directional logical connection between the two time slots associated with each "four-wire" path and hence allows digitized traffic to be transferred through switch 5 between the caller and the called parties.

MF receivers 11 are used to receive well known incoming multi-frequency signalling messages over lead 7 from, for example, a switching network or other switching equipment connected thereto. These messages, appropriately transformed from MF signalling form into digital data, are routed by control bus interface 13 over busses 30 to central processors 80 for interpretation therein. In addition, when instructed by central processors 80, any one of these MF receivers can be connected through lead 12 to T/S/T matrix switch 40 for use in processing a call being connected therethrough. Similarly, MF transmitters 15 receive digital signalling messages over busses 30 from central processors 80, convert these messages into appropriate well known MF signalling form and transmit resulting MF signalling messages over lead 9 onto a signalling network or other switching machine connected thereto. In addition, when instructed by central processors 80, any one of these MF transmitters can be connected through lead 14 to T/S/T matrix switch 40 for use in processing a call connected therethrough.

Control bus interface 50 is also connected to busses 30. This interface, also well known, is connected via link 53 to a well known common channel interoffice signalling (CCIS) network to transmit and receive signalling packets thereover for use, where needed, in processing various calls through tandem switch 5. Such a signalling network could likely include, as discussed in detail below, a signal control point (SCP—specifically shown in FIG. 5) and one or more signal transfer points (STPs) with communication occurring through this signalling network illustratively using signalling system 7 (SS7) or a similar packet based signalling protocol.

Thusfar, the peripherals that have been explained as well as their operation in providing call routing through a tandem switch are well known in the art and are generally used in sector (routing between adjacent area codes), access (routing to a toll network provided by an inter-exchange carrier) or operator service (routing incoming calls to an operator) tandem switches.

Now, in accordance with the teachings of my present invention, mass announcements, whether passive or interactive can be provided through a telephone switch, such as a tandem switch, in a manner that can accommodate a substantial number of different announcements in which each announcement can be provided on a substantially non-blocking basis to individual callers during times of peak call volume therefor with substantially reduced latency and holding delays over those associated with announcement circuits known in the art. Furthermore, the inclusion of an interactive mass announcement capability within my inventive tandem switch readily and inexpensively permits this switch to implement interactive mass announcement based custom call routing and other interactive mass announcement based services, as described below.

In particular, mass announcements are provided through my invention by connecting an announcement circuit as one input to a T/S/T matrix switch located within a tandem telephone switch and permitting the central processors that control the tandem switch to establish a logical (here time slot) connection between that circuit and any caller. Digitized announcements are stored in a main announcement store that is also contained within the tandem switch and is controlled by the central processors. With this arrangement, the central processors respond to each incoming call for a specific announcement by establishing a time slot connection between that announcement circuit and the caller through the T/S/T matrix switch, downloading this announcement from the main announcement store into the announcement circuit and thereafter instructing the announcement circuit to play the announcement in PCM digital form over the time slot connection to the caller, and specifically over the caller's "receive" leg of the "four-wire" path established through the matrix switch. By connecting a sufficient number of announcement circuits as inputs to the T/S/T matrix switch within the tandem switch, any caller that reaches the tandem switch can be connected to an available time slot served by an announcement circuit to provide essentially non-blocking mass announcement service. In addition, for interactive mass announcements, the central processors connect a DTMF receiver to a time slot connection established through the T/S/T matrix switch to the caller's "transmit" leg of this "four-wire" path in order to obtain a digit(s) entered by the caller during playback of the announcement. These digits may include "0" through "9" and the keys "*" and "#" all of which exist on a push button telephone set and which will hereinafter be collectively referred to as simply "digits". During the announcement, the announcement circuit executes a specific script, typically involving a decision tree contained therein, associated with the announcement and, in response to the entered digit(s), appropriately instructs the central processors within tandem switch 5 to route the call presently connected to the announcement in a specific manner for custom call routing services and/or to provide other call processing operations to support interactive call services defined by the script.

By providing this custom call routing within a tandem switch and as part of the call processing occurring therein, interactive mass announcement based custom call routing services can be provided by a local telephone company (telco) at a relatively low cost to an information provider (IP), particularly without requiring that IP to employ expensive switching equipment or to obtain a large number of dedicated lines and/or trunks from the telco. By storing and playing back announcements within the tandem switch rather than within customer premise equipment as typically occurs with announcement equipment known in the art, the IP does not need to lease any lines from the telco to carry announcements. As such, mass announcement services may become affordable to a small IP who in the past was not able to afford the cost of a leased line(s). Moreover, a telco is not required to allocate any specific telephone number(s) or lines to announcement service but rather can establish mass announcement service in conjunction with any subscriber number. In addition, by simply counting the calls routed to any announcement number, which is a well known tandem function, the revenue due to an associated IP can be easily determined. Resulting call statistics are typically maintained on a well known accounting and administrative sub-system located within the tandem switch and, for redundancy, can also be maintained on a remote database system, such as an service control point, as described below.

In addition, by providing interactive mass announcement based customized call routing within the tandem switch as part of call processing occurring therein and prior to establishing a final call route therethrough—in contrast to providing customized routing at the end of a voice path as would currently occur in the art, my inventive tandem switch is advantageously able to provide very efficient and flexible call routing as part of an interactive announcement. This efficiency is enhanced inasmuch as my inventive tandem switch requires no additional time slot connections for servicing interactive announcements than those provided for handling a passive announcement. Specifically, telephone switches inter-connect "four-wire" paths associated with a caller and a called party. Rather than ignoring, i.e. essentially wasting, one half of the path (apart from connecting a resistor thereacross to prevent so-called "howling"), specifically the caller's "transmit" leg of the "four-wire" path associated therewith as occurs with passive announcements, a DTMF receiver is connected within my inventive tandem switch to this leg within the "four-wire" path leading to the caller in order to capture digit(s) entered by the caller during announcement playback for use in completing the routing of the call through the switch thereby providing mass announcement based custom call routing services.

Specifically, to provide both passive and interactive mass announcement service in accordance with the teachings of my invention, tandem switch 5 contains four additional components over those described thus-far; specifically DTMF (dual tone multi-frequency) receivers 60, announcement circuit 300, announcement processor 400 and main announcement store 70. Each of these four components has a control bus interface associated therewith, specifically control bus interfaces 63, 310, 410 or 77, that permits that component to be controlled by instructions received over busses 30 from central processors 80 as well as to transfer announcement data, as described below, over these busses and among these four components. Each of these control bus interfaces is essentially identical to that described above and contains a local processor and accompanying control and interface circuitry, all of which is readily apparent to these skilled in the art, needed to interface that local processor to busses 30 and to the specific component, i.e. components 60, 300, 400 or 70, associated therewith.

Main announcement store 70 stores each separate mass announcement, whether passive or interactive, typically in digitized PCM form. This store contains two separate announcement memories: announcement memory 73, also labelled as announcement memory A, and announcement memory 75, also labelled as announcement memory B. These memories can be formed of separate storage areas physically situated within a common memory. Each announcement is typically stored in two versions, each of which resides in a different one of the announcement memories. One version of an announcement, residing in, for example, announcement memory A, is an "old" version thereof which is currently accessible; while the other version of the same announcement, residing in announcement memory B, is typically a "new" (or updated) version thereof which can be accessed commencing at a pre-defined activation date and time. Both the new version of the announcement and its activation date and time are provided by an IP, as will be discussed in detail shortly, for storage within main announcement store 70. Central processors 80 maintain an internal real time clock (not shown). Whenever date and time values produced by the real time clock matches an activation date and time for a given announcement, the central processors change the version of that announcement that is currently accessible from the "old" to the "new" version. Thereafter, the "old" version is no longer in use and can subsequently be updated by an IP.

Announcement circuit 300, under control of central processors 80 and typically in response to an incoming call to an announcement number serviced by switch 5, receives a digitized PCM announcement over busses 30 from an appropriate one of the two announcement memories residing within main announcement store 70 and thereafter plays the announcement onto a specific time slot in a TDM bit stream as specified by central processors 80. This bit stream, containing 24 (or 32) time slots, is applied by leads 335 to an input of T/S/T matrix switch 40. This announcement circuit can accommodate simultaneous playback of 24 or 32 announcements, whether different or not, depending upon whether tandem switch 5 is adapted to American or European standards. For purposes of simplification, only one announcement circuit 300 is specifically shown as part of switch 5 in FIGS. 1A and 1B. However, to provide substantially non-blocking announcements during peak call volume intervals, switch 5 would include a number of individual identical announcement circuits. This number would be maximally set equal to the number of outgoing time slots served by switch 5, e.g. approximately 55,000 for a tandem switch similar in size to a "4ESS" type switch (manufactured by American Telephone and Telegraph [AT&T], Inc.), divided by the number of time slots (24 or 32) that can be simultaneously handled by each individual announcement circuit. In this manner, every one of the individual time slots associated with all incoming trunk groups 10 can be connected to a different one of the time slots collectively handled by all the announcement circuits, thereby ensuring that every caller which reaches tandem switch 5 can be connected through T/S/T matrix switch 5 to a time slot that will carry the announcement desired by that caller. In this manner, the capacity of the tandem itself, which is quite substantial, becomes the limiting factor on the number of callers for mass announcement service that can be simultaneously served thereby. Inasmuch as every call for mass announcement service that reaches my inventive tandem switch is routed to an announcement circuit, very few, if any, calls are lost thereby enhancing the resulting revenue for both the telco and associated IP. Furthermore, through this arrangement, the holding delay experienced by any caller who is routed by the network to tandem switch 5 advantageously can be made extremely short—to a value most likely imperceptible to the caller. The holding delay here would encompass the time required to establish time slot interconnections through the T/S/T matrix switch and between an announcement circuit and the caller, download an announcement from the main announcement store to that announcement circuit and then initiate announcement playback through that announcement circuit. Moreover, since a separate copy of an announcement is played back starting at its beginning by an announcement circuit over a different time slot connection to each caller to this announcement, each such caller experiences very little, if any, latency delay in hearing an announcement once a time slot connection has been established through switch 5 between the caller and an announcement circuit.

An announcement circuit, as described in detail below in conjunction with FIG. 3, contains a microprocessor based system for locally storing an announcement in PCM form received from the main announcement store and then sequentially reading that announcement from its local store onto a given one of 24 (or 32) time slots.

Announcement processor 400, under control of central processors 80, interacts with an IP to obtain an announcement therefrom, then undertake subsequent processing (specifically signal restoration) thereof and thereafter download the processed version of this announcement into the appropriate memory within main announcement store 70. Inasmuch as conversion from analog voice to digital PCM form and vice versa for any announcement during both recording and playback takes place within a local switch associated with a subscriber or an IP, the announcement processor only manipulates announcements in digital PCM form. Although FIGS. 1A and 1B only show the inclusion of one announcement processor 400 within switch 5 in order to simplify the drawing, this switch, depending upon the number of separate IPs that is to be served at any one time, could contain two or possibly more announcement processors to accommodate these IPs.

An announcement processor, as described in detail below in conjunction with FIG. 4, contains a microprocessor based system for locally receiving an announcement in PCM form from an IP over a particular TDM time slot from T/S/T switch matrix 40 and appearing on leads 435. The announcement processor also contains appropriate circuitry for executing well known signal restoration algorithms on the received announcement in order to change the power spectra of the received announcement to a pre-defined shape and amplitude. The announcement processor also contains a local store which stores the processed announcement until such time as the processed announcement can be downloaded over busses 30 as the "new" or "updated" announcement into an appropriate announcement memory within main announcement store 80. While a single pair of busses 30 is shown interconnecting announcement circuit 300, announcement processor 400 and main announcement store 70, to expedite call processing within switch 5, one or more separate paired busses (not shown) can be used to interconnect the announcement circuit(s) to the main announcement memory and to interconnect the announcement processor(s) to the main announcement memory. In this manner, central processors 80 are able through short instructions transmitted over busses 30 to set up DMA transfers of announcement data to subsequently occur over the separate paired busses running among announcement circuit 300, announcement processor 400 and main announcement store 70 thereby permitting busses 30 to handle other communication involving the central processors while any of these DMA transfers are in progress.

DTMF receivers 60 typically contain a number of individual identical DTMF receivers (not specifically shown) that can be connected, via leads 62, to a specific time slot by T/S/T matrix switch 40 in order to obtain a digit(s) entry dialed by a caller during announcement playback. The particular receiver that is to be connected as well as the time slot that is to be associated therewith is provided to DTMF receivers 60 over busses 30 by central processors 80. Whenever such a receiver detects a DTMF digit dialed (i.e. depressed) by a caller through, for example, a keypad on a push-button telephone set, that receiver places an appropriate digital data word that identifies the receiver and the digit entry, onto busses 30 for subsequent use by an appropriate announcement circuit in executing a decision tree within a software script associated with the announcement that, for example, instructs the central processors to provide custom call routing services. Inasmuch as the circuitry for these DTMF receivers is well known, this circuitry will not be discussed in any detail. The number of DTMF receivers that would likely be used within tandem switch 5 would be determined through appropriate traffic engineering.

Figure 2:
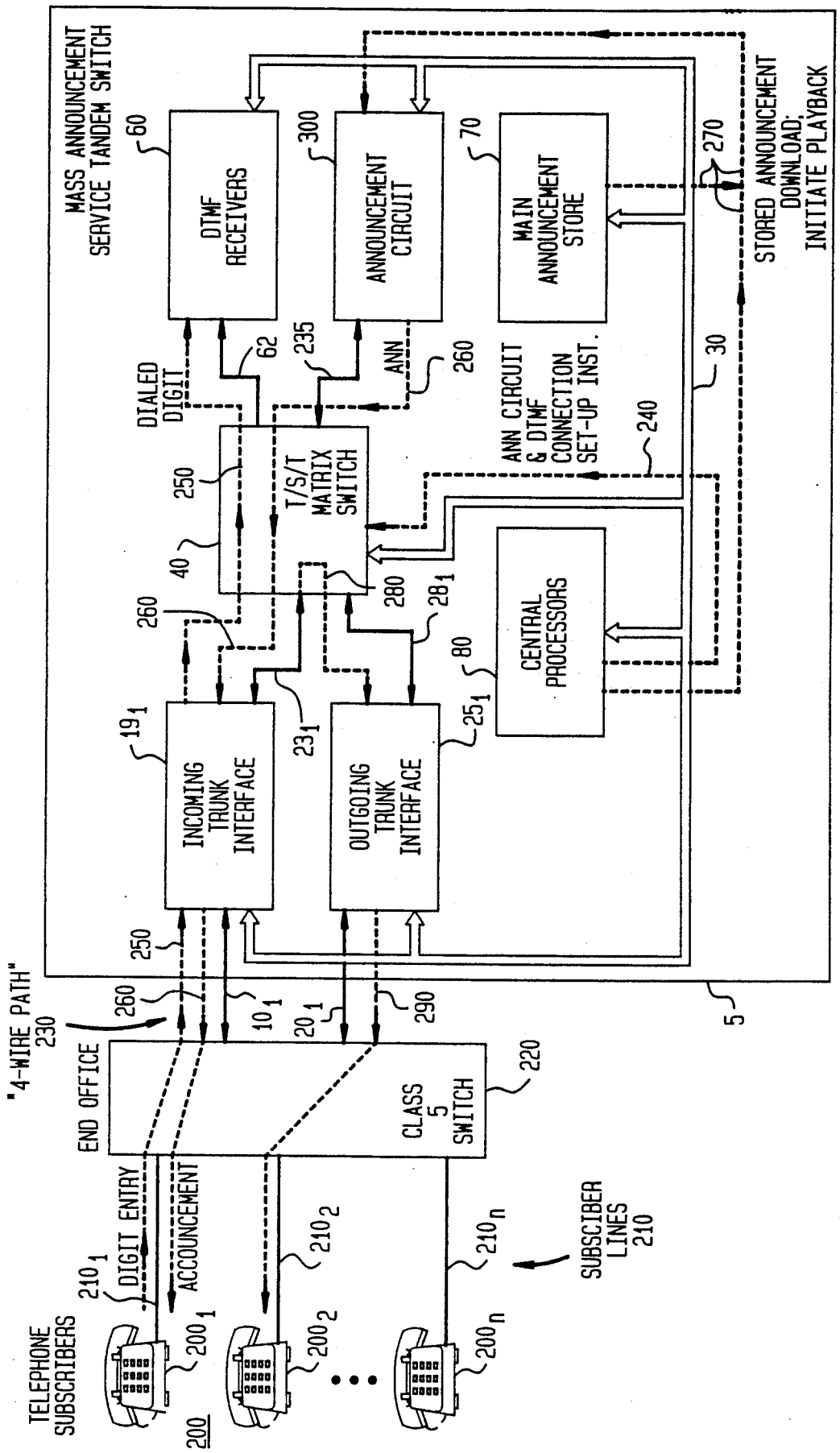
FIG. 2 depicts a simplified block diagram of my inventive mass announcement service tandem switch 5 showing the basic message flow occurring therein and also involving an end office and a telephone subscriber for providing an interactive announcement to the subscriber.

With the above in mind, FIG. 2 depicts a simplified block diagram of my inventive mass announcement service tandem switch 5 showing the basic message flow occurring therein and also involving an end office and a telephone subscriber for providing an interactive announcement to this subscriber. Inasmuch as the starting portion of this message flow is the same as the total message flow occurring during the provision of a passive (non-interactive) announcement, the portion applicable to both types of announcements will be discussed first followed by a discussion of the remaining message flow associated with an interactive announcement.

Specifically, as shown in FIG. 2, tandem switch 5 is situated on the trunk side of end (local) office (class 5) switch 220—which can typically be a "5ESS" type switch or the like or even a number "5 cross-bar" switch with a "D4" type channel bank (all of which are manufactured by AT&T) for providing voiceband analog to TDM, and TDM to voiceband analog conversions. To simplify the remaining discussion, the end office switch will be assumed to be a digital switch. The trunk side of end office switch is illustratively shown as connected through incoming trunk group $10_1$ and outgoing trunk group $20_1$ to tandem switch 5. Subscribers 200 collectively formed of individual subscribers $200_1$, $200_2$, ... $200_n$ with associated telephone sets are connected through subscriber lines $210_1$, $210_2$, ..., $210_n$ which collectively form subscriber lines 210 to appropriate line terminations (not specifically shown) on end office switch 220.

To simplify this figure, only those components of tandem switch 5 that are necessary to understand the message flow for announcement processing occurring therein are specifically shown. As such, tandem switch 5 is shown as containing incoming and outgoing trunk interfaces $19_1$ and $25_1$ connected through leads $18_1$ and $28_1$, respectively, to T/S/T matrix switch 40. These incoming and outgoing trunk interfaces, the switch matrix, DTMF receivers 60, announcement circuit 300, main announcement store 70 and central processors 80 are all interconnected by busses 30, which is shown here for simplicity as one bus.

In response to an incoming call (not specifically shown) from subscriber $200_1$ over line $210_1$ to a subscriber number associated with a mass announcement, end office 220 routes the call to tandem switch 5 over incoming trunk group $10_1$ to incoming trunk interface $19_1$. Once central processors 80 decode the dialed digits for the subscriber number associated with this call, the central processors determine that this call is for an announcement, identify the specific announcement being requested and then set up an announcement circuit in order to provide this announcement to the caller. Specifically, central processors 80 send instructions, as symbolized by dashed line 240, to T/S/T matrix switch 40 to establish logical connections between an available time slot serviced by announcement circuit 300 and a time slot associated with a "four-wire" path existing between the caller situated on trunk group $10_1$ and switch 5. For a passive announcement, the "receive" leg of the "four-wire" path established to the caller is used to carry the announcement from announcement circuit 300 while the "transmit" leg of this path extending through T/S/T matrix switch 40 is resistively terminated (not specifically shown), as noted above. However, for an interactive announcement, central processors 80 establish a time slot connection over this "transmit" leg through T/S/T matrix switch 40 to an available DTMF receiver within receivers 60 rather than resistively terminating this leg.

Once the time slot connections have been made, central processors 80 access the proper version of the announcement ("old" or "new"—depending upon whether the activation date and time of the latter announcement version has been reached) in digitized PCM form that is associated with the dialed subscriber number from the appropriate memory residing within main announcement store 70. The entire digitized announcement is then sequentially transferred, typically on a direct memory access (DMA) basis, over busses 30 from main announcement store 70 into announcement circuit 300 and specifically into that portion of the random access (RAM) memory located within the announcement circuit that is associated with the particular time slot that is to carry this announcement. These operations are symbolized by dashed line 270. Once the announcement has been completely transferred into local RAM memory or even while the transfer is underway, central processors 80 then provide an "initiate" instruction over busses 30 to announcement circuit 300. This instruction specifies which of the 24 (or 32) time slots handled by the announcement circuit is to carry the announcement and instructs the announcement circuit to begin playing back, i.e. reading, the announcement from its beginning on this time slot in PCM form over lead 235. At this time, the central processors also designate this time slot on announcement circuit 300 to be "busy". By virtue of the time slot connection established through T/S/T matrix switch 40, the caller will begin hearing the announcement, specifically through incoming trunk interface $19_1$, incoming trunk group $10_1$, end office 220 and line $210_1$, and will continue hearing the announcement until either the announcement concludes or the caller hangs up, as symbolized by dashed line 260. Once central processors 80 provide the "initiate" instruction, announcement circuit 300 takes full control over providing the announcement. When the announcement concludes, announcement circuit 300 suitably signals central processors 80 by providing an "announcement complete" command over busses 30. The "announcement complete" command, specifying both the specific announcement circuit and the time slot for the announcement, causes central processors 80 to tear down the time slot connections between the caller and announcement circuits and then allocate this time slot within the announcement circuit as being available to handle a subsequent caller. In the event a malfunction occurs within the announcement circuit, announcement circuit 300 will provide a suitable error signal over busses 30 to central processors 80 to tear down this time slot connection and release the caller. While the announcement is being provided to the caller, central processors 80 also monitor the connection to the caller. In the event central processors 80 receive a trunk disconnect signal either from incoming trunk interface $19_1$ or through a signalling network (not shown) prior to the conclusion of the announcement, the central processors will send a suitable "announcement abort" command over busses 30 specifying the announcement circuit and the particular time slot and will also initiate well known procedures to tear down the time slot connections established through T/S/T matrix switch 40 between the caller and announcement circuit 300. Upon receipt of this "announcement abort" command, the announcement circuit will simply terminate the announcement then in progress. If a passive (non-interactive) announcement was being played to a caller, then the steps described thusfar would constitute the entire procedure undertaken within tandem switch 5 to play that announcement to the caller.

If, however, the caller dialed a subscriber number associated with an interactive announcement, then switch 5 would undertake additional steps. Specifically, the announcement itself would contain appropriate voice message(s) or tone(s) prompting the caller to enter one of a number of digits from those specified in a menu of available choices. Once the prompt message or tone was completed, the announcement circuit would stop the announcement from progressing any further until the caller entered the required digit(s). As noted above, for an interactive announcement, T/S/T matrix switch 40 establishes a time slot connection between the "transmit" leg of the "four-wire" path for the caller and a receiver within DTMF receivers 60 to capture digit(s) entered by the caller during the announcement. Once the caller entered each digit, this digit would be collected by an assigned receiver within DTMF receivers 60 which, in turn, would send a data word, including the receiver number and digit collected, to announcement circuit 300 via busses 30. At the start of the interactive announcement, the announcement circuit would begin executing an appropriate script for interactive processing. After every digit was collected during the interactive announcement, the announcement circuit would progress through a decision tree contained within the script to determine the proper operation that is to be performed for the caller in response to the digit. This operation could encompass waiting for the next digit entry, to using the digit as an index into a different section of the announcement, to instructing central processors 80 to route the call to a different number ("call transfer"). In the event a routing operation is selected, announcement circuit 300 would send an appropriate instruction, such as to transfer the call to a specified telephone number, over busses 30, to central processors 80 to initiate this operation. If the incoming call is to be routed to a new number, e.g. that associated with subscriber $200_2$, the central processors would generate an appropriate instruction to incoming trunk interface $19_1$ to place this call on hold and would also generate appropriate instructions to T/S/T matrix switch 40 to disconnect announcement circuit 300 and DTMF receivers 60 from this call and also outpulse the new number through an outgoing trunk, e.g. a trunk on outgoing trunk group $20_1$, to a local switch, e.g. end office switch 220, in order to establish a routing path to the new called party, e.g. to subscriber $200_2$ via line $210_2$. Once this path was established between caller subscriber $200_1$ and new called subscriber $200_2$, the central processors would instruct T/S/T matrix switch 250 to establish a logical connection therethrough between these parties, as symbolized by dashed lines 280 and 290 in order to re-route the call from the announcement circuit as specified by the announcement to the new called party. The new called number can illustratively be a different extension within a given private exchange, such as a different department within an organization, or a different seven or ten digit telephone number associated with a desired party situated within or outside of the caller's local service area. Alternatively, to increase processing speed associated with an interactive announcement, the decision tree, including permissible digit entries and accompanying responses, within a script associated with this announcement could be transferred from the announcement circuit at the start of the announcement into the central processors for execution thereby. In this case, the central processors would react to and decode the digits collected by the DTMF receivers and route the call appropriately without relying on an announcement circuit to decode each digit and appropriately signal the central processors.

As noted, the specific interactive announcement downloaded into announcement circuit 300 would contain a specific script that has an internal decision tree specifying how the digits entered by the caller are to be decoded, i.e. what routing or other operations are to be provided. Since scripting to provide custom routing and/or other call processing functions within a telephone switch is well known to those skilled in the art, the details of the scripting itself and any decision tree used thereby will not be discussed in any further detail. Suffice it to say, the specific command structure used in the script itself and the call routing instructions communicated over busses 30 to central processors 80 would depend upon the software used within the announcement circuit and the call processing software used in the central processors—the latter would likely vary from one tandem switch to another. The structure of the decision tree itself would be predicated by the call routing and/or call non-routing processing choices specified by an IP within an interactive announcement.

FIG. 3 depicts a block diagram of announcement circuit 300 that forms part of tandem switch 5 shown in FIGS. 1A and 1B. As noted, the announcement circuit receives an announcement from main announcement store 70 (see FIGS. 1A and 1B, or 2) and thereafter plays the announcement back over an appropriate time slot. The announcement circuit, as shown in FIG. 3, contains control bus interface 310, processor 320, time slot gate and control 330, program memory 340 and RAM memory 350 all interconnected through local bus 360.

Control bus interface 310 provides an interface for busses $30_1$ and $30_2$ that collectively form busses 30 (see FIGS. 1A and 1B) to local bus 360. Processor 320, shown in FIG. 3, is typically a well known microprocessor that executes a control program stored in program memory 340 which is implemented typically using read only (ROM) memory. RAM memory 350 contains announcement store 352 that stores digitized PCM announcements downloaded either over bus $30_1$ or $30_2$ from main announcement store 70 (see FIGS. 1A and 1B) and also contains time slot assignment store 356 (see FIG. 3) that contains a table (not shown) that specifies the correspondence between time slots then in use and each announcement stored within announcement store 352. In the event the same announcement is to be provided by announcement circuit 300 over two or more different time slots, then only one copy of that announcement needs to be stored within announcement store 352 with the correspondence between these time slots and this announcement being indicated within the table stored within time slot assignment store 356. Moreover, if that announcement is one that is sufficiently busy, i.e. being accessed on a sufficiently frequent basis during a given time interval, then that announcement could be locally maintained within, rather than being successively downloaded to, announcement store 352 with appropriate entries being made in the table as new time slot(s) are assigned to carry that announcement. Furthermore, central processors 80 could adapt the operation of the announcement circuits to satisfy anticipated heavy call volume for a given announcement. In this regard, whenever the central processors anticipate that a given announcement is likely to soon experience heavy call volume, these processors could download a given version, such as the most recently updated version, of that announcement into a requisite number of announcement circuits shortly prior to the expected onset of that heavy call volume and then throttle back, through limiting available time slot assignments, the availability of these circuits and the time slots served thereby to handle other announcements. Hence, the central processors would effectively allocate a given number of specific time slots served by these announcement circuits to only serve this announcement. The requisite number of announcement circuits and allocated time slots can be fixed or be dynamically or manually changed as warranted by call volume. In particular, central processors 80, based upon magnitude and temporal occurrence of recent peak(s) in call volume for a given announcement, could dynamically change, i.e. increase or decrease, the number of time slots and announcement circuits which are allocated, on such an anticipatory basis, to handle that announcement in order to adapt to recent changes in prior call volume to that announcement in an attempt to effectively match available resources to changing demand for this announcement. Furthermore, manual commands could be provided into central processors 80 by a traffic manager in order to change the number of time slots (and announcement circuits) assigned to handle any such announcement during abnormal situations, e.g. to play an announcement for an updated weather forecast that warns of impending bad weather conditions.

Time slot gate and control 330 is a well known circuit that multiplexes PCM announcement bit streams read out from announcement store 352, on a DMA basis, into 24 (or 32) appropriate TDM time slots that collectively form a TDM signal appearing on leads 335.

In operation, as noted, central processors 80 (see FIGS. 1A and 1B, or 2) download an announcement into announcement circuit 300. The incoming PCM announcement data is stored within an input buffer (not shown) situated within control bus interface 310 until such time as this announcement can be processed by processor 320, as shown in FIG. 3. Specifically, the PCM announcement data is prefaced with an instruction specifying the announcement circuit number, here circuit 300, and the time slot associated with this announcement. In response to the instruction, processor 320 establishes a DMA path over bus 360 between control bus interface 310 and announcement store 352 within RAM 350 and thereafter initiates a DMA transfer operation to transfer the incoming PCM announcement data into store 352. Once this transfer is complete, processor 320 updates the time slot assignment store to establish a correspondence between this announcement data and the particular time slot. After this occurs, the announcement circuit, at least with respect to this announcement, waits for an "initiate" instruction from central processors 80 (see FIGS. 1A and 1B, or 2) prior to playing back this announcement. Once the "initiate" instruction is received, processor 320 accesses time slot assignment store 356 to determine the time slot that should be used to carry this announcement and thereafter specifies this slot assignment to time slot gate and control 330. Once this occurs, processor 320 establishes a DMA transfer between announcement store 352 and time slot gate and control 330 to sequentially read the entire announcement starting at its first location into time slot gate and control 330 and therethrough onto the time slot assigned thereto contained within the TDM signal appearing on leads 335. Once the announcement data has been fully transferred through time slot gate and control 330, processor 320, as noted above, generates an appropriate "announcement complete" command for this announcement over busses 30 to central processors 80 (see FIGS. 1A and 1B, or 2). In addition, the DMA transfer between announcement store 352 and time slot gate and control 330 ceases in the event processor 320, as shown in FIG. 3, detects a malfunction within the announcement circuit or receives an "announcement abort" command over busses 301 or 302 from central processors 80. Announcement circuit 300 operating under control of processor 320 is capable of simultaneously handling 24 (or 32) announcements, all with different start times relative to each other. Given the above description of the functions provided by announcement circuit 300, the program that is executed by processor 320 to provide these functions is readily apparent to skilled in the art and as such, for purposes of brevity, will not be discussed further.

FIG. 4 depicts a block diagram of announcement processor 400 that also forms part of tandem switch 5 shown in FIGS. 1A and 1B. As noted above, the announcement processor, under control of central processors 80 within tandem switch 5, interacts with an IP to obtain an announcement therefrom, then performs signal restoration on the digitized PCM announcement obtained from the IP and thereafter downloads the restored version of this announcement into the appropriate memory within main announcement store 70. The announcement processor possesses a similar architecture to that of an announcement circuit. Specifically, the announcement processor, as shown in FIG. 4, is formed of bus interface 410, processor 420, time slot gate and control 430, program memory 440, RAM memory 450, and restoration circuit 470 all interconnected through local bus 460.

Control bus interface 410 provides an interface for busses $30_1$ and $30_2$ that collectively form busses 30 (see FIGS. 1A and 1B) to local bus 460. Processor 420, shown in FIG. 4, is typically a well known microprocessor, similar to that used in announcement store 300, that executes a control program stored in program memory 440 which is also implemented typically using read only (ROM) memory. RAM memory 450 is a local temporary data store that stores an incoming digitized announcement provided by an IP. This RAM memory also stores a processed version of this announcement until such time as this version can be downloaded, via control bus interface 410 and either bus $30_1$ or $30_2$, as the "new" or "updated" announcement into an appropriate memory within main announcement store 80 (see FIGS. 1A and 1B). Once an incoming announcement provided by an IP is fully stored within RAM memory 450, restoration circuit 470, shown in FIG. 4, changes the power spectra of this announcement to a pre-defined well known shape and amplitude that are preferred for signal carriage over digital TDM telephonic facilities. This restoration generally entails breaking the frequency spectra of the incoming PCM announcement obtained from the IP into pre-defined high, middle and low frequency voice bands and modifying the power spectra within each band to achieve an essentially uniform power spectra throughout the entire frequency range of the announcement as well as from one announcement to the next. This ensures that all announcements are stored within main announcement store 70 for subsequent play back at a uniformly high level of signal quality. Inasmuch as the circuitry that forms restoration circuit 470 is well known to those skilled in the art as is the specific signal restoration algorithm(s) implemented therein, neither circuit 470 will nor this algorithm(s) will be discussed in any further detail herein. Time slot gate and control 430 is a well known circuit that demultiplexes a desired sequential announcement bit stream from the 24 (or 32) time slot TDM signal produced by T/S/T matrix switch 40 and appearing over leads 435 and also provides the reverse (multiplexing) operation discussed above. A resulting demultiplexed sequential bit stream is applied by circuit 470, via bus 460, to RAM memory 450 for storage therein.

Inasmuch as the operations provided by the announcement processor in recording and processing an incoming announcement obtained from an IP occur in conjunction with certain call processing functions provided by central processors 80 contained within tandem switch 5, the operation of announcement processor 400 and the related functions provided by central processors 80 will now be collectively discussed. Accordingly, the following discussion will simultaneously refer to FIGS. 1A and 1B, and 4.

Specifically, prior to storing an announcement within tandem switch 5, an IP will generally record his announcement in analog form on an appropriate recorder. For purposes of simplifying this discussion, assume that this announcement is passive (non-interactive). After an IP has recorded his announcement and is ready to store it within tandem switch 5, that IP dials a pre-defined telephone number associated with announcement recording, e.g. "976-XXXX" where "X" can be any digit assigned by the telco between "0" and "9". Once a local switch signals tandem switch 5 that a call to this number is being routed to the latter switch over an incoming trunk within incoming trunk groups 10, central processors 80 generate appropriate instructions, via busses 30, to T/S/T matrix switch 40. These instructions cause switch 40 to establish a logical connection between time slots associated with this call on trunk groups 10 and an available time slot on announcement processor 400 for the "receive" leg of the "four-wire" path to the IP and also to attach a DTMF receiver within receivers 60 to a time slot associated with the "transmit" leg of this "four-wire" path in order to obtain each digit entered by the IP. Once these time slot connections are established, central processors 80 apply an appropriate instruction over busses 30 to announcement processor 400 in order to initiate an announcement recording procedure on a time slot specified in the instruction, i.e. one of 24 (or 32) time slots handled by the announcement processor. Once this instruction is received, processor 420 specifies to time slot gate and control circuit 430 the specific time slot that it is to use in its connection to T/S/T matrix switch 40. Thereafter, processor 420 accesses a pre-defined PCM "welcome" voice message and transfers this message on a DMA basis to time slot gate and control circuit 430 and therethrough onto this time slot as part of the 24 (or 32) time slot TDM signal appearing on leads 435 for carriage through T/S/T matrix switch 5 to the calling IP. This "welcome" message, as well as all other pre-defined voice messages as described below, can be stored in PCM form within ROM memory 440 or can be downloaded in PCM form over busses 30 into RAM 450 within announcement circuit 440 from main announcement store 70 during appropriate initialization procedures executed by announcement processor 400. The "welcome" message identifies that announcement recording is to occur and requests the IP to enter (dial) his subscriber number, specifically a "dial-back" number, followed by a numerical password. As the calling IP successively enters each digit of this information, this digit is collected by the DTMF receiver within receivers 60 and communicated over busses 30 to announcement processor 400. Once processor 420 determines that it has collected all the digits for the dial-back number and the password, processor 420 supplies an appropriate "IP verification" instruction over bus 460, control bus interface 410 and busses 30 to central processors 80. This instruction contains the dial-back number and password that have been entered by the IP and requests the central processors to verify this information. In response to this instruction, central processors 80 access a database (not specifically shown) located within main memory 90 containing a list of dial-back numbers and corresponding passwords of authorized IPs served by tandem switch 5. If central processors 80 determine that the dial-back number and password match that associated with an IP entry in the database, then the central processors provide an "IP verified" instruction, over busses 30, to announcement processor 400 and specifically, through control bus interface 410 and bus 460, to processor 420 located therein. This instruction, when executed, by processor 420 causes announcement processor 400 to play a pre-defined "IP verified" voice message stored therein to the caller stating that the caller has been verified and instructing the caller to hang up his telephone. Alternatively, if central processors 80 are unable to verify the calling IP, due to a mismatch between either the stored dial-back or password with that entered by the calling IP, then central processors 80 provide an "IP not verified" instruction, over busses 30, to announcement processor 400 and specifically, through control bus interface 410 and bus 460, to processor 420 located therein. This instruction, when executed by processor 420, causes a pre-defined "IP not verified" voice message stored within announcement processor 400 to be played to the caller stating that the caller can not be verified and instructing the caller to hang up his telephone, then re-dial the announcement recording telephone number and repeat the digit entry process.

After either the "IP verified" or "IP not verified" voice message has been played back by announcement processor 400, processor 420 sends a "disconnect and dial-back" instruction, via bus 460, control bus interface 410 and busses 30, to central processors 80. Upon receipt of this instruction, central processors 80 initiate a well known tandem switch control sequence to disconnect the calling IP and terminate the call. Shortly after this disconnect has occurred, central processors 80 instruct an available outgoing trunk interface to seize two available time slots on an outgoing trunk and then outpulse the dial-back number associated with this IP onto this trunk. Once a "four-wire" path is established to the IP through an end office switch, central processors 80 instruct T/S/T matrix switch 40 to establish a "four-wire" path between announcement processor 400 and the time slots on the seized outgoing trunk thereby connecting the IP through T/S/T matrix switch 40 to the announcement processor. In addition, central processors 80 instruct the T/S/T matrix switch to establish a time slot connection therethrough from an available DTMF receiver located within receivers 60 to the IP in order to collect digits dialed by the IP for controlling the announcement recording process, e.g. specifying when the IP has concluded playing its announcement, and for entering an activation date and time and/or other IP specified data used in the announcement recording process.

After these operations have occurred, central processors 80 apply an appropriate instruction over busses 30 to announcement processor 400 instructing processor 400 to record an incoming announcement appearing on a time slot specified in this instruction. At this point and in response to this instruction, processor 420 plays a pre-defined voice message stored within announcement processor 400 to the caller instructing the caller to begin playing its recorded announcement. Once this message concludes, the IP plays its analog announcement into its telephone connection which, by virtue of passing through a digital end office switch, is converted by this end office into digital PCM form and appears in the assigned time slot within the TDM signal appearing on leads 435. While the incoming announcement is applied to announcement processor 400, the announcement is stripped from the TDM signal appearing on leads 435 by time slot gate and control 430 and stored, through a DMA process under control of processor 420, directly into RAM memory 450. Once the IP appropriately signals the announcement processor that it has concluded playing its announcement, processor 420 instructs restoration circuit 470 to appropriately process the new announcement, as described above, now stored in RAM 450. Once the announcement has been fully processed, processor 420 plays a pre-defined voice message stored within announcement processor 400 to the caller prompting the caller to enter a corresponding digit from a pre-defined menu to hear the processed announcement, erase the announcement, re-start the recording process, abort the announcement recording process or whether the processed announcement, as it stands, is satisfactory. Based upon the value of the digit entered by the IP collected by the DTMF receiver and passed back to the announcement processor, processor 420 will invoke the operation requested by the IP. In the event the IP enters a digit indicating that the announcement is satisfactory, processor 420 will generate an appropriate "announcement accept" instruction, via bus 460, control bus interface 410 and busses 30, to central processors 80 informing the central processors that this announcement will now be stored within main announcement store 70. The central processors respond by specifying, through an instruction placed thereby onto busses 30, to announcement processor 400 whether the processed announcement should be stored within announcement memory 73 or 75 (i.e. announcement memory A or B) existing within main announcement store 70 and the starting location at which the announcement should be stored therein. Thereafter, processor 420 transfers, i.e. downloads, the processed announcement from RAM memory 450, via bus 460, control bus interface 410 and busses 30, as the "new" or "updated" version of this announcement into the specified announcement memory and starting at the specified location within main announcement store 70. After the processed announcement has been fully downloaded within main announcement store 70, processor 420 successively accesses pre-defined voice messages stored within announcement processor 400 and plays these messages, again via a DMA operation involving time slot gate and control 430, to the caller in order to successively prompt the caller to enter digits, in an appropriate format, for an activation date and time for this new announcement, i.e. the date and time when tandem switch 5 can begin playing this announcement in response to subscriber calls therefor. Each digit received from the caller is collected by a receiver within DTMF receivers and supplied through busses 30 to processor 420. Once all the digits have been collected, processor 420 transfers these digits through a suitable instruction to central processors 80 for storage within main memory 90. Based upon the value of the activation date and time and continual comparison thereof against real time values, central processors 80 change the version of the announcement that is currently accessible from the "old" to the "new" or "updated" version. Thereafter, the "old" version would no longer be in use and can subsequently be updated by an IP. After this has occurred, the central processors initiate a well known tandem switch control sequence to disconnect the IP and terminate the call. Thereafter, to complete the announcement recording process, central processors 80 release the resources that have been used in recording this announcement in order to permit these resources to be subsequently reassigned in recording another announcement.

Now, in the event the announcement provided by an IP is interactive, the IP will include appropriate prompt tone(s) within the announcement it plays to the telco during the announcement recording process. These tone(s) will signal the announcement processor to insert a pause command into the processed announcement such that an announcement circuit, during playback of this announcement, will temporarily stop playback of this announcement in order to collect digit(s) from a caller. In addition, the IP will provide the telco with the customized routing plan and/or other call processing operations that is to be utilized in conjunction with this announcement. The telco will convert this routing plan and the other call processing operations into a decision tree as part of an appropriate script. This script will be loaded into the announcement memory that contains the processed announcement such that central processors 80, during any subsequent access of this announcement, can for example load both the script and processed announcement into an announcement circuit for respective execution therein and playback thereby. Given the above description of the specific operations provided by announcement processor 400, the software that executes within this announcement processor to provide these operations is readily apparent to those skilled in the art and as such, for purposes of brevity, will not be discussed further herein.

An announcement, whether passive or interactive, can also include an instruction provided by an IP to the tandem switch to eliminate ringing. This instruction would likely be stored along with the activation date and time within main memory 90 and obtained by an announcement processor in response to a voice message prompt provided thereby to the IP. Without ringing, announcement playback would commence as soon as tandem switch 5 establishes a connection between an end office serving a caller and an announcement circuit. By eliminating ringing, each caller would be allocated a time slot on an announcement circuit for a shorter period of time than if ringing were to occur. Accordingly, tandem switch 5 could serve an increased number of callers to a particular announcement during a given measurement interval, such as an hour, thereby increasing the call revenue occurring during this interval to both the associated IP and a telco.

By now those skilled in the art realize that, by storing each different announcement in a common store within a tandem switch and utilizing shared resources—specifically DTMF receivers, announcement circuits and announcement processors—to play back and record announcements, my inventive tandem switch advantageously can accommodate a substantial, essentially unlimited number, of different announcements and different IPs without use of a dedicated channel for any announcement or IP. The incremental cost of handling another announcement within my inventive tandem switch essentially becomes the cost of the memory space required within main announcement store 70 to store one additional announcement in digitized PCM form. Since incremental mass memory space tends to be quite inexpensive, the cost of announcement service charged by a telco to each IP would likely be substantially lower, particularly for interactive announcements, than that associated with announcement circuits known in the art. This, in turn, allows both IPs and the telcos to still economically provide announcement services at significantly reduced call volumes from those associated with announcement circuits known in the art.

Though up to this point I have described interactive announcements as being essentially used in conjunction with the provision of custom call routing services, use of these announcements in conjunction with my inventive tandem switch is not so limited. In fact, the interactive aspect of the announcement, through which a caller enters a digit response to a menu of pre-defined choices and that digit is collected and subsequently processed within the tandem, permits the tandem to collect a vast multitude of different data from incoming callers using menu based caller selection, then process this data in nearly any manner requested by an IP, and thereafter provide the results of this processing thereto. Custom call routing can be just one result of this processing. Order collection can be another result through which the tandem switch 5 provides an interactive announcement to a caller and through caller responses to a menu of choices detailing available goods or services and subsequent prompts contained within the announcement for ordering information, such as quantity desired and credit card number, collects caller orders for specific goods or services on an automated basis for eventual delivery to an IP and therethrough or directly to a supplier therefor. Other results, which involve rendering numerical data to an IP or other party, can illustratively include furnishing raw "peg counts" of the number of callers during a measurement interval that selected each choice from a given menu and/or furnishing data that has been generated by statistically processing caller selections in a manner specified by the IP or a recipient of the data, if different from the IP. Services of this nature encompass caller polling through which a caller dials into an interactive mass announcement number and is then successively polled for each of his answers, e.g. opinions and/or selections, to a pre-defined list of questions. Once a requisite sample of callers has been polled, the tandem can then telemeter the raw peg counts for each selection and the total number of callers, such as through a modem connection, to a remote computer at a customer site for further statistical processing thereat. In addition, a remote database system, as illustratively described below, can be used in conjunction with my inventive tandem switch to either fully or partially process caller responses in order to illustratively: validate a caller's request to either receive a "caller paid" announcement service or place an order through an automated ordering service, such as through checking appropriate remote databases containing payment information and providing a signalling message to the tandem to provide the announcement or accept the order if the caller has sufficient credit therefor; or to translate a logical subscriber number dialed by a caller into a physical destination (e.g. plain old telephone service—POTS) number which, in turn, is provided by the remote database system to the tandem switch through a signalling message occurring therebetween in order to effectuate customized call routing.

Hence, with the above description of my inventive tandem switch in mind, I will now discuss one of many applications, here electronic voting, that can utilize my inventive tandem switch for providing interactive mass announcements to incoming callers and furnishing caller responses obtained therefrom and which relies on providing collected caller supplied data rather than customized call routing to a service customer.

Specifically, a simplified block diagram for interactive electronic voting system 500 which includes my inventive tandem switch 5, end office switches and a signal control point (SCP) operative through a common channel interoffice signalling (CCIS) network, and also the basic message flow occurring within system 500 are all collectively depicted in FIGS. 5A and 5B; the correct alignment of the drawing sheets for these figures is shown in FIG. 5.

As shown in FIGS. 5A and 5B, system 500 includes tandem switch 5 connected through incoming and outgoing trunk interfaces to end offices 220 and 510 which respectively serve subscriber station sets $200_1$, $200_2$, ..., $200_n$ who collectively form telephone subscribers 200 and remote polling location telephone stations $505_1$, $505_2$, ..., $505_n$ which collectively form stations 505. Well known signalling connections between any end office and tandem switch 5 and associated processing circuitry within switch 5 are not shown to simplify the figures. Control bus interface 50 is connected through link set 53 to a well known common channel interoffice signalling (CCIS) network that uses an appropriate well known signalling protocol, such as signalling system 7 (SS7). This signalling network contains a hierarchy of well known signal transfer points (STPs)—each of which is essentially a packet switch for transferring signalling messages through this network, although for simplicity only one such STP, i.e. STP 590, is specifically shown. STP 590 is itself connected through link set 595 to service control point (SCP) 600. SCP 600 is a remote database system that contains processor 610 which is connected to both modem 620 and database 630. This modem is used by processor 610 to establish a telephonic connection over line 625 to the recipient of the voting results, specifically a Board of Elections, and to transfer these results obtained through system 500 thereto. Database 630 is disk based and contains voter records that includes, for example, the name, social security number and voter registration number of each registered voter that is to be served by system 500. Additional information as dictated by security considerations and needed for proper voter validation, such as, for example, a personal identification number (PIN) and/or the caller's assigned subscriber number, can also be included in each such voter record.

Operationally speaking, to utilize electronic voting through system 500, a caller, such at subscriber station $200_1$, dials a pre-defined telephone number assigned by the telco and associated with electronic voting service. In response to this dialed number, end office 220 routes the call along with the caller's telephone number, i.e. the caller's so-called "ANI" (automatic number identification) into tandem switch 5. In response to this call, central processors 80 identify that the interactive voting announcement is being requested and thereafter set up announcement circuit 300 in order to provide this announcement to the caller. Specifically, central processors 80 send instructions, as symbolized by dashed line 515, to T/S/T matrix switch 40 to establish logical connections between an available time slot serviced by announcement circuit 300 and a time slot associated with the "receive" leg of a "four-wire" path associated with the caller over trunk group $10_1$ as well as between a time slot for the "transmit" leg of this "four-wire" path and a time slot for an available receiver within DTMF receivers 60. As such, the "receive" leg of the "four-wire" path established to the caller carries the voting announcement from announcement circuit 300, while the "transmit" leg of this connection extending through T/S/T matrix switch 40 carries digits that will be entered by the caller to the DTMF receiver.

Once these time slot connections have been made, central processors 80 access the voting announcement in digitized PCM form from the appropriate memory residing within main announcement store 70. The entire digitized announcement, including a script associated therewith, is then sequentially downloaded, typically on a direct memory access (DMA) basis, over busses 30 from main announcement store 70 into announcement circuit 300 and specifically into that portion of the random access (RAM) memory located within the announcement circuit that is associated with the particular time slot and which is to carry this announcement. These operations are symbolized by dashed line 520. Once this download is complete or even while the download is underway, central processors 80 issue an "initiate" instruction over busses 30 to announcement circuit 300; this instruction also being symbolized by dashed line 520. In response to this "initiate" instruction, announcement circuit 300 commences execution of the script and playback of an appropriate voice message "welcoming" the caller to electronic voting service. The flow of this voice message and all others generated to the caller by announcement circuit 300 are collectively symbolized by dashed line 540. All of these voice messages collectively form part of the announcement and are downloaded into the announcement circuit. Alternatively, to save processing times, the announcement may be downloaded once into the announcement circuit and stored therein for subsequent local access for successive re-use.

At this point, the announcement circuit verifies that the caller is entitled to vote. Specifically to perform this function, the announcement circuit, under control of the script and specifically the decision tree therein, plays back an appropriate voice message on a specified time slot to the caller through T/S/T matrix switch 40 and end office 220 prompting the caller to sequentially enter his social security number followed by his voter registration number and, if used, the voter's PIN. Once this message concludes, announcement circuit 300 issues an instruction, as symbolized by dashed line 550, to central processors 80 indicating that this announcement circuit is waiting for the caller to enter the requested digits. After this instruction is rendered, announcement circuit 300 stops the announcement from progressing any further until the caller entered the required digit(s). As the caller enters each digit, as symbolized by dashed line 530, this digit entry is routed by T/S/T matrix switch 40 and leads 62 to the DTMF receiver located within receivers 60. Each digit, appropriately decoded, is then forwarded by this receiver over busses 30 to central processors 80, as symbolized by dashed line 552. Alternatively, the DTMF receiver can send each decoded digit to the announcement circuit which, in turn, after the entire voter registration number, social security number and, if used, PIN have been entered by the caller, will group the digits for these numbers into an appropriate data word(s) and forward the word(s) to central processors 80. The digit collection process, whether it occurs within the central processors as shown or within the announcement circuit, iteratively continues until either the caller has entered all the requested digits or has pressed an appropriate digit on the telephone to conclude digit entry.

In any event, once all the requested digits for the voter registration number, social security number and, if used, PIN have been entered, central processors 80 forms a query message to remote database system (SCP) 600. This query message contains an instruction to the SCP to perform a database access operation into a voter record specified by the voter registration number and determine whether the social security number and, where used, PIN entered by the caller matches that stored within that voter record. In order to simplify the voting procedure, the caller's ANI can used in lieu of the social security number in the event that the ANI is associated with a residence telephone, thereby obviating the need for the caller to enter his or her social security number when voting from home. In this case, the ANI for the caller would be matched against that stored within the voter record for the caller. Once central processors 80 assemble the query message, this message would be routed, via busses 30 and as symbolized by dashed line 554, to control bus interface 50. This interface would launch an appropriate SS7 query into the CCIS network to SCP 600, i.e. convert the query message into an appropriate SS7 query packet and transmit the resulting SS7 query packet, via link set 53 and as symbolized by dashed line 562, to STP 590 within the CCIS network for routing therethrough to SCP 600.

Upon receipt of the SS7 query packet, processor 610 situated within SCP 600 strips the query from the SS7 packet and performs an access into voter record database 630, using the voter registration number contained in the query as a pointer into the database. Once the appropriate voter record is accessed, the processor extracts either the ANI or social security number and matches either of these entries, where appropriate, and, where used, the PIN against corresponding entries within the accessed voter record. In the event that these entries match those stored within the voter record thereby validating the voter, processor 610 constructs a response message stating that the caller is entitled to vote. Processor 610 then fabricates a SS7 response packet that contains this "entitled" response message and transmits this packet back through the CCIS network, here containing STP 590, to tandem switch 5 wherein the response message is routed over busses 30 to central processors 80, all as symbolized by dashed line 564. Alternatively, in the event a mismatch occurs for any number associated with the caller, i.e. the entered social security number, ANI or, where used, PIN, processor 610 would fabricate an appropriate "non-entitlement" response message instructing central processors 80 that the caller can not be verified as an authorized voter and thus is not entitled to vote. Voting non-entitlement can also occur in the event database 630 has been updated to reflect that the caller has already voted, as will be explained in detail below. In any event, a "non-entitlement" response message contains appropriate data specifying the specific reason why the caller is not entitled to vote, i.e. mismatch of a number entered by the caller, lack of a voter record for the voter registration number entered by the caller, or prior voting. Whatever the reason, processor 610 then fabricates an appropriate SS7 response packet containing this "non-entitlement" response message and transmits this response message, also symbolized by dashed line 664, back through the CCIS signalling network to tandem switch 5. In response to this message, central processors 80 instruct announcement circuit 300 to play back a pre-defined voice message requesting the voter to re-enter the digits at which point the verification procedure will repeat. In the event that this additional attempt fails to verify the voter, the script executing within the announcement circuit initiates playback of another pre-defined voice message stating that the voter can not be verified. Once this voice message is concluded, announcement processor 300 instructs central processors 80 to disconnect the call from the voter, tear down the time slot connections used therein for the call and free that portion of the announcement circuit that was used in servicing this call. A similar disconnect procedure could occur, though with a different pre-defined voice message being played to the caller, in the event the announcement circuit or central processors 80 detected a malfunction in the voting procedure. In the event central processors 80 detect a pre-mature call disconnection, such as when the caller prematurely hangs up, the central processors provide an appropriate "announcement abort" command, as discussed above, over busses 30 to announcement circuit 300 in order to simply terminate the current announcement and also instruct T/S/T matrix switch 40 to disconnect the time slot connections associated with this call.

In the event that the SS7 response message routed by SCP 600 through the CCIS network to tandem switch 5 indicates that the caller is entitled to vote, central processors 80 applies an instruction (not specifically shown) over busses 30 to announcement circuit 300 instructing this announcement circuit to proceed with the interactive voting announcement, specifically a selection and vote confirmation procedure. At this point, the announcement circuit takes complete control over rendering the remainder of this announcement to the caller and collecting digit entries therefrom. Specifically, announcement circuit 300 plays back a pre-defined voice message that recites a given menu for all offices and public questions with appropriate sub-menus of available choices, such as candidates and specific public questions for which the caller is eligible to vote, to the caller. This menu can vary from caller to caller, with the specific menu and accompanying sub-menus for any given caller determined through access into voter records database 630 and a database (not shown)

of all offices and questions collectively being voted upon by all callers. Such a menu might include the message "You have selected to vote for President of the United States". This would be followed by verbalization in a sub-menu of "The Democratic candidate for President of the United States is" along with the name of a candidate then followed by "Press '1' if you desire to vote for this candidate. Press '0' otherwise" and so on for the other candidates. Similar messages would be played for each different candidate, for each different office and for each public question. The announcement may be configured such that at the conclusion of the voice message for each candidate, the voting announcement for example, prompts the caller to enter a digit for that candidate and waits for the entry. Rather than querying the voter through an entire list of candidates for each office, once the caller depresses a "1" for any one candidate, the decision tree executing within the script for this announcement may be configured to jump to, for example, successive voice messages for the candidates for the next office being voted upon and so on. In any event, each digit entered by the caller is collected by the DTMF receiver within receivers 60 and passed back through busses 30 to announcement circuit 300. This interactive process repeats until the voter has been queried for his or her selections for entire slate of offices and public questions, if any. After the voter has indicated all his or her choices, the script permits the voter, again through voice message prompting and digit entry, to instruct the announcement circuit to confirm the selected choices by playing back a succession of voice messages stating which choices have been made by the caller and to permit the caller to instruct the announcement circuit to repeat any part or all of the voice prompt and selection process to correct an erroneous selection. One such voice message used to confirm a selection, might illustratively be "For President of the United States, you have selected the Democratic candidate" followed by verbalization of the name of the candidate. The caller can be given the option, through digit entry, of discontinuing the confirmation process at any time during the voice message. Depending upon the decision tree used within the script for the interactive voting announcement, the caller can be given significant latitude in skipping through sections of the selection and vote confirmation procedure. The caller is also prompted to depress a specific digit on his or her telephone to finally confirm that all the selections the caller has made thusfar, including all corrections therefor, are to be recorded and then to end the call for electronic voting service. In response to depression of this key, announcement circuit 300 plays back a pre-defined voice message thanking the caller for voting electronically.

In addition, once the caller finally confirms all of his or her selections, announcement circuit 300 transmits appropriate instructions over busses 30 to central processors 80 to transfer these choices to the central processors and thereafter to have these choices recorded within SCP 600. In response to these instructions, central processors 80 fabricates an appropriate update message for this caller and which contains the choices that have just been made thereby. The update message will be routed over busses 30 to control bus interface 50 which, in turn, fabricates an appropriate SS7 packet containing this message. This packet is then applied by interface 50 through the CCIS network, specifically STP 590, to SCP 600; all of the message flow therefor being collectively symbolized by dashed lines 566. In response to the SS7 packet, processor 610 updates the voter record for the caller to indicate that the caller has just voted, by setting the value of an appropriate flag (e.g. a "voted" flag) stored therein, and also increments various "raw peg counts" (cumulative vote totals) stored within database 630 to reflect the choices just made by the caller. At the conclusion of voting hours and/or at pre-selected times during election day, processor 610 establishes a data connection through modem 630 and line 625 to a computer (not shown) at the Board of Elections and transfers these "raw peg counts" thereto for further tabulation and processing thereat. If desired by the Board of Elections, processor 610 can also perform any desired statistical processing on the most recent "raw peg counts" and provide the results of this processing over this modem connection to the Board of Elections at periodic intervals during election day.

In an effort to prevent an individual from voting twice, either first electronically and subsequently in person at a polling location or vice versa, each polling location has a corresponding telephone station (with more station sets for busy polling locations) located thereat for use by election officials stationed there, such as stations $505_1, \ldots, 505_n$. Through the station, a polling official can dial into system 500 and confirm whether the individual has already voted or not. For example, assume an individual appears at, for example, a polling station having station set $505_1$. Prior to allowing this individual to vote, a polling official dials a special "voter verification" telephone number to gain access into a voter verification function provided by system 500. After this number is dialed, the official, through voice message prompting described above generated through announcement circuit 300, enters the voter registration number of the individual. Alternatively, to facilitate this access, each voter could be issued a plastic voter registration card having a magnetic strip along its rear surface. The voter registration number of this individual would be encoded into this strip. By merely passing an individual's voter registration card through a well-known combined reader and automatic dialing unit (not shown) used for station set $505_1$, the polling official can easily launch a request message into electronic system 500 and quickly verify whether the individual is now entitled to vote. Specifically, once the card was appropriately read, the automatic dialer would dial the "voter verification" number and wait for a connection to be established to tandem 5 and a carrier signal to be provided from a modem (not shown) contained within tandem 5 and connected as input to, for example, incoming trunk interface $19_2$. In response to a call over line $510_1$ routed through end office 510 and appearing on incoming trunk group $10_2$ and incoming trunk interface $19_2$, central processors 80 establish a "four-wire" time slot connection between tandem switch 5 station $505_1$ through end office switch 510. Once a carrier is detected by the reader contained within station set $505_1$, the reader transmits the voter registration number associated with the individual. Thereafter, central processors 80 fabricate a "voter verification" query message containing this voter registration number and routes this query message over busses 30 to control bus interface 50. This interface generates an appropriate SS7 packet containing this query message and transmits this packet through the CCIS network, specifically STP 590, to SCP 600; the latter operation symbolized by dashed line 582. In response to this query message, processor 610 accesses database 630 using the voter registration number and obtains the value of the "voted" flag stored within the voter record. The value of this flag is then transmitted by SCP 600 back to tandem switch 5 within a "voter verification" response message within an SS7 response packet, a symbolized by dashed line 584. Central processors 80, in response to the value of this flag, generate an appropriate signal for carriage through the "four-wire" path established through incoming trunk interface $19_2$ to end office 510. This signal, when received at station $505_1$, causes an appropriate indicator or message to be displayed locally thereat specifying that the individual has already voted or not. In the event the person has not voted electronically but will now do so manually at the polling location, the polling official can now depress an appropriate key at station $505_1$ to signal tandem switch 5 which, in turn, instructs SCP 600 to merely update the voter record for this individual to reflect that he or she has now voted manually. Once this occurs, tandem switch 5 will release the connection to station $505_1$ and thereby terminate the call to the verification function provided by system 500. Alternatively, if a regular telephone set were used for station set $505_1$, tandem switch 5 could utilize voice messaging, as described above, to prompt the polling official to enter a digit that instructs SCP 600 through the tandem switch to update the voter records in order to reflect that an individual has voted manually. Advantageously, use of my inventive system for electronic voting should appreciably reduce the cost of elections and provide faster election results than those which currently occur.

Moreover, other services can be rendered through my inventive tandem switch that rely on selectively providing either a passive or interactive announcement, the latter with customized call routing, to a caller, based upon call processing statistics. For example, one such service is the so-called "disk jockey" service. Here, a radio announcer would place a call to a specific number terminating at the tandem switch and dials a predetermined code and other information, such the desired caller in succession, to activate the service. Once this occurs, the announcer solicits callers to dial an announcement number by stating that he or she will award a prize to a particular caller in succession, such as illustratively the 20th or 100th caller. Callers then dial the announcement number, which is associated with a specific mass announcement. The inventive tandem maintains peg counts of incoming calls to this announcement number. When a particular caller in sequence, as specified by a service subscriber, reaches the tandem switch, a particular passive announcement is played to that caller stating that he or she is the winner and should not hang up. Once the announcement concludes, that specific caller is then routed to a particular number, such as that for the announcer or disk jockey at the radio station who will then "over the air" award a prize to this caller. In contrast, each of the other "non-winning" callers will be routed to an interactive announcement that first states that this caller is not a winner and then provides the caller with a pre-defined menu of items which this caller can order and then solicits an order therefrom, as described above or, via a passive announcement, to a telemarketing line manned by an operator. Clearly, variants of this service can be easily provided using different types of announcements with incoming calls thereto being processed in nearly any manner desired by a service subscriber.

Furthermore, announcements used in conjunction with my invention are not limited to containing only a verbalized message(s). Specifically, each announcement contained with the main announcement store and originating with an IP can contain audio data that collectively forms a slow scan vide image in addition to a verbal message(s). With a suitable slow scan telephone receiver at a caller's location, that caller can receive a slow scan picture of an item, such as that being offered for sale by the IP, followed by a verbal description of the item and a solicitation and order entry message. In fact, such an announcement can contain a succession of slow scan images which a caller can successively display, either in response to appropriate voice prompts or anytime during playback of the announcement, by depressing an appropriate digit on his telephone as instructed by the verbal message in the announcement and defined by a script associated with the announcement. Moreover, if the announcement provides the caller with access to any of a large number of slow scan images—used for example in implementing a telephone catalog sales service, a database containing these images can be stored in a remote database system, such as illustratively an SCP. In response to caller entry, the central processor in the tandem switch would formulate and transmit a request to the remote database system to receive data for a specific image and, upon its receipt, would transfer this data to an announcement circuit for subsequent play back to the caller as part of an on-going announcement. By combining presenting a caller with both video and audio formats in a single announcement, heightened caller perception and reaction, over that provided by verbal message(s) alone, should result from that announcement.

By now those skilled in the art clearly realize that although the announcement circuit has been discussed above as handling either 24 or 32 time slots and hence simultaneously playing back announcements to either 24 or 32 callers—so as to maintain compatibility with existing tandem switches, an announcement circuit can be readily designed to handle an increased or decreased number of time slots and simultaneously play back announcements to a corresponding number of callers, as dictated by the number of time slots used in TDM links existing within other tandem switches. Similarly, an announcement processor can be readily designed to handle a different number of time slots and hence simultaneously occurring IPs than either 24 or 32 such IPs.

Additionally, even though my inventive mass announcement system has been described in the context of being implemented within a tandem switch, my inventive system can be readily implemented within an end office switch, such a "5ESS" switch or the like, or even in a suitably large private branch exchange (PBX) to provide localized passive or interactive mass announcement service and even localized custom call routing or other localized announcement based services. In this case, announcement circuit(s), announcement processor(s), DTMF receivers and an announcement memory would be incorporated within the end office switch or PBX. The announcement circuit(s), announcement processor(s) and DTMF receivers would be connected to suitable TDM inputs to a T/S/T matrix switch located within the end office switch or PBX. Suitable changes would be made to the software that controls the local switch or PBX in order to connect a caller via appropriate "four-wire" time slot connections to an announcement circuit or an announcement processor and/or a DTMF receiver, in a manner similar to that described above, depending upon the number which the caller dialed and to provide the desired call and announcement processing.

Although a preferred embodiment which incorporates the teachings of the present invention has been shown and described in detail herein along with various exemplary applications of the invention, those skilled in the art can readily devise many other varied embodiments that still incorporate these teachings and/or numerous other applications that utilize the invention.

I claim:

1. Mass announcement apparatus for telephonically providing announcements to callers therefor comprising:

a processor;

storage means for digitally storing a first plurality of announcements;

announcement circuit means for storing a second plurality of announcements and for producing a first time division multiplexed signal having a first plurality of recurring time slots wherein each announcement in said second plurality of announcements appears on a corresponding one of said first time slots;

interface means for producing a second time division multiplexed signal having a second plurality of recurring time slots;

switch means for establishing a first time slot connection between a time slot of said first plurality of recurring time slots in said first time division multiplexed signal and a time slot of said second plurality of recurring time slots in said second time division multiplexed signal and associated with a caller; and means for interconnecting said processor, said storage means and said announcement circuit means; and wherein said processor, in response to a telephone number dialed by said caller and associated with a selected one of said first plurality of announcements, instructs said switch means to establish said first time slot connection between said first and said second plurality of recurring time/slots, causes the selected announcement to be downloaded over said interconnecting means from said storage means to said announcement circuit means for storage therein as one of said second plurality of announcements, and instructs said announcement circuit means to play back said selected announcement on the time slot of said first plurality of recurring time slots so as to carry the selected announcement over the first time slot connection from said announcement circuit to said caller.

2. The apparatus in claim 1 wherein said switch means comprises a time-space-time matrix switch.

3. The apparatus in claim 2 wherein said first time slot connection carries the selected announcement to only one caller.

4. The apparatus in claim 3 wherein each one of said first plurality of announcements comprises a verbal message stored in pulse code modulated form.

5. The apparatus in claim 4 further comprising an announcement processor connected to interconnecting means and to said switch means for performing signal restoration on an incoming announcement applied to said switch means so as to generate a restored announcement and for downloading the restored announcement over said interconnecting means into said storage means as a corresponding one of said first plurality of announcements.

6. The apparatus in claim 3 wherein said storage means further comprises means for storing first and second versions of each of said first plurality of announcements, said second version having pre-defined activation date and time values associated therewith.

7. The apparatus in claim 6 wherein said processor determines whether the activation date and time value associated with each one of said first plurality of announcements matches current date and time values and, in the event such a match occurs for any one of said first plurality of announcements, designates the new version of said one announcement in said first plurality of announcements as said selected announcement to be downloaded into said announcement circuit for any subsequent call to a telephone number associated with the one announcement.

8. The apparatus in claim 3 wherein said interconnecting means comprises a bus and wherein said bus is also connected to said switch means.

9. The apparatus in claim 3 wherein said selected announcement further comprises a pre-defined script stored within said storage means and wherein said script comprises a pre-determined decision tree defining interactivity that is to occur between the announcement circuit and said caller and call processing operations that are to be performed in response to digit entry by said caller.

10. The apparatus in claim 9 further comprising a DTMF receiver, connected to said interconnecting means and to said switch means, for collecting digits entered by the caller during play back of said selected announcement and for providing a data word representing said digit to said interconnecting means; and wherein said switch means, in response to an instruction received from said processor, establishes a second time slot connection between a third recurring time slot in the second time division multiplexed signal associated with the caller and a fourth time slot associated with the DTMF receiver so as to form a four-wire connection to said apparatus and said caller and comprising said first and second time slot connections.

11. The apparatus in claim 10 wherein each one of said first plurality of announcements comprises a verbal message stored in pulse code modulated form.

12. The apparatus in claim 10 further comprising an announcement processor connected to said interconnecting means and to said switch means for performing signal restoration on an incoming announcement applied to said switch means so as to generate a restored announcement and for downloading the restored announcement over said interconnecting means into said storage means as a corresponding one of said first plurality of announcements.

13. The apparatus in claim 10 wherein said storage means further comprises means for storing first and second versions of each of said first plurality of announcements, said second version having pre-defined activation date and time values associated therewith.

14. The apparatus in claim 13 wherein said processor determines whether the activation date and time value associated with each one of said first plurality of announcements matches current date and time values and, in the event such a match occurs for any one of said first plurality of announcements, designates the new version of said one announcement in said first plurality of announcements to be downloaded as said selected announcement into said announcement circuit for any subsequent call to a telephone number associated with the one announcement.

15. The apparatus in claim 10 wherein said interconnecting means comprises a bus and wherein said bus is also connected to said switch means.

16. In a communication system having a processor, means for digitally storing a first plurality of announcements, announcement circuit means for storing a second plurality of announcements and for producing a first time division multiplexed signal having a first plurality of recurring time slots wherein each announcement in said second plurality of announcements appears on a corresponding one of said first time slots, interface means for producing a second time division multiplexed signal having a second plurality of recurring time slots, switch means for establishing a first time slot connection between a time slot of said first plurality of recurring time slots in said first time division multiplexed signal and a time slot of said second plurality of recurring time slot in said second time division multiplexed signal and associated with a caller, and interconnection means for interconnecting said processor, said digitally storing means and said announcement circuit means; a method for telephonically providing an announcement to a caller therefor comprising the steps of:
  establishing through said switch means said first time slot connection between the first and said second plurality of recurring time slots;
  downloading, in response to a telephone number dialed by said caller and associated with a selected one of said first plurality of announcements, the selected announcement over said interconnection means from said digitally storing means to said announcement circuit means for storage therein as one of said second plurality of announcements; and
  playing back said selected announcement from said announcement circuit on the time slot of said first plurality of recurring time slot so as to carry the selected announcement over the first time slot connection from said announcement circuit to said caller.

17. The method in claim 16 further comprising the step of decoding the telephone number in order to select a specific one of said first plurality of announcements to be the selected announcement.

18. The method in claim 17 wherein said first time slot connection carries the selected announcement to only one caller.

19. The method in claim 18 wherein each one of said first plurality of announcements comprises a verbal message stored in pulse code modulated form.

20. The method in claim 19 wherein said system further comprises an announcement processor connected to said interconnection means and to said switch means, and wherein the method further comprises the steps of:
  performing signal restoration on an incoming announcement applied to said switch means so as to generate a restored announcement; and
  downloading the restored announcement over said interconnection means into said digitally storing means as a corresponding one of said first plurality of announcements.

21. The method in claim 18 further comprising the step of storing first and second versions of each of said first plurality of announcements in said digitally storing means, said second version having pre-defined activation date and time values associated therewith.

22. The method in claim 21 further comprising the steps of:
  determining whether the activation date and time value associated with each one of said first plurality of announcements matches current date and time values; and
  designating, in the event such a match occurs for any one of said first plurality of announcements, the new version of said one announcement in said first plurality to be downloaded into said announcement circuit as the selected announcement for any subsequent call to a telephone number associated with the one announcement.

23. The method in claim 18 wherein said selected announcement further comprises a pre-defined script stored within said digitally storing means wherein said script comprises a pre-determined decision tree defining interactivity that is to occur between the announcement circuit and the caller and call processing operations that are to be performed in response to digit entry by said caller.

24. The method in claim 23 wherein said system further comprises a DTMF receiver, connected to said interconnection means and to said switch means, for collecting digits entered by the caller during play back of said selected announcement and for providing a data word representing said digit to said interconnection means; and wherein the method further comprises the step of establishing, through said switch means and in response to an instruction received from said processor, a second time slot connection between a third recurring time slot in the second time division multiplexed signal associated with the caller and a fourth time slot associated with the DTMF receiver so as to form a four-wire time slot connection to said caller and comprising said first and second time slot connections.

25. The method in claim 24 wherein each one of said first plurality of announcements comprises a verbal message stored in pulse code modulated form.

26. The method in claim 24 wherein the system further comprises an announcement processor connected to said interconnection means and to said switch means, and wherein the method further comprises the steps of:
  performing signal restoration on an incoming announcement applied to said switch means so as to generate a restored announcement; and
  downloading the restored announcement over said interconnection means into said digitally storing means as a corresponding one of said first plurality of announcements.

27. The method in claim 24 further comprising the step of storing first and second versions of each of said first plurality of announcements in said digitally storing means, said second version having pre-defined activation date and time values associated therewith.

28. The method in claim 27 further comprising the steps of:
  determining whether the activation date and time value associated with each one of said first plurality of announcements matches current date and time values; and
  designating, in the event such a match occurs for any one of said first plurality of announcements, the new version of said one announcement in said first plurality of announcements as the selected announcement to be downloaded into said announcement circuit for any subsequent call to a telephone number associated with the one announcement.

* * * * *